US009332272B2

(12) United States Patent
Nagaoka

(10) Patent No.: US 9,332,272 B2
(45) Date of Patent: May 3, 2016

(54) ENCODING APPARATUS, ENCODING METHOD, AND COMPUTER PRODUCT

(71) Applicant: FUJITSU LIMITED, Kawasaki-shi, Kanagawa (JP)

(72) Inventor: Hirofumi Nagaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 14/181,651

(22) Filed: Feb. 15, 2014

(65) Prior Publication Data

US 2014/0269922 A1    Sep. 18, 2014

(30) Foreign Application Priority Data

Mar. 18, 2013 (JP) ................. 2013-054728

(51) Int. Cl.
*H04N 19/56* (2014.01)
*H04N 19/52* (2014.01)
*H04N 19/176* (2014.01)
*H04N 19/463* (2014.01)

(52) U.S. Cl.
CPC ............. *H04N 19/56* (2014.11); *H04N 19/176* (2014.11); *H04N 19/463* (2014.11); *H04N 19/52* (2014.11)

(58) Field of Classification Search
CPC ...... H04N 19/176; H04N 19/61; H04N 19/51
See application file for complete search history.

(56) References Cited

U.S. PATENT DOCUMENTS

2005/0111551 A1* 5/2005 Sato et al. ................. 375/240.16
2007/0286281 A1 12/2007 Tsuchiya et al.
2008/0037642 A1* 2/2008 Tsuchiya et al. ......... 375/240.16

FOREIGN PATENT DOCUMENTS

JP    2005-244503 A    9/2005
JP    2007-318578 A    12/2007

* cited by examiner

*Primary Examiner* — Joseph Ustaris
*Assistant Examiner* — Zhubing Ren
(74) *Attorney, Agent, or Firm* — Fujitsu Patent Center

(57) ABSTRACT

An encoding apparatus includes a processor that calculates and stores, an evaluation value for each candidate vector, based on a given block to be encoded among blocks formed by dividing an image, and a reference block on a reference image represented by each candidate vector that is a candidate motion vector of the given block; identifies an evaluation value of a first candidate motion vector of the given block, based on the stored evaluation values; calculates an evaluation value of a second candidate motion vector, based on the evaluation value of each candidate vector and the second candidate motion vector selected for the given block from among motion vectors of blocks adjacent to the given block; and determines the first or the second candidate motion vector to be the motion vector of the given block, based on the respective evaluation values of the first and the second candidate motion vectors.

6 Claims, 28 Drawing Sheets

COST CURVED SURFACE [0] TABLE — 801_0

| | X (16 PATTERNS) | | | | | | | | | | | | | | | |
|---|---|---|---|---|---|---|---|---|---|---|---|---|---|---|---|---|
| Y (16 PATTERNS) | -8 | -7 | -6 | -5 | -4 | -3 | -2 | -1 | 0 | 1 | 2 | 3 | 4 | 5 | 6 | 7 |
| -8 | 128 | 113 | 100 | 89 | 80 | 73 | 68 | 65 | 64 | 65 | 68 | 73 | 80 | 89 | 100 | 113 |
| -7 | 113 | 98 | 85 | 74 | 65 | 58 | 53 | 50 | 49 | 50 | 53 | 58 | 65 | 74 | 85 | 98 |
| -6 | 100 | 85 | 72 | 61 | 52 | 45 | 40 | 37 | 36 | 37 | 40 | 45 | 52 | 61 | 72 | 85 |
| -5 | 89 | 74 | 61 | 50 | 41 | 34 | 29 | 26 | 25 | 26 | 29 | 34 | 41 | 50 | 61 | 74 |
| -4 | 80 | 65 | 52 | 41 | 32 | 25 | 20 | 17 | 16 | 17 | 20 | 25 | 32 | 41 | 52 | 65 |
| -3 | 73 | 58 | 45 | 34 | 25 | 18 | 13 | 10 | 9 | 10 | 13 | 18 | 25 | 34 | 45 | 58 |
| -2 | 68 | 53 | 40 | 29 | 20 | 13 | 8 | 5 | 4 | 5 | 8 | 13 | 20 | 29 | 40 | 53 |
| -1 | 65 | 50 | 37 | 26 | 17 | 10 | 5 | 2 | 1 | 2 | 5 | 10 | 17 | 26 | 37 | 50 |
| 0 | 64 | 49 | 36 | 25 | 16 | 9 | 4 | 1 | 0 | 1 | 4 | 9 | 16 | 25 | 36 | 49 |
| 1 | 65 | 50 | 37 | 26 | 17 | 10 | 5 | 2 | 1 | 2 | 5 | 10 | 17 | 26 | 37 | 50 |
| 2 | 68 | 53 | 40 | 29 | 20 | 13 | 8 | 5 | 4 | 5 | 8 | 13 | 20 | 29 | 40 | 53 |
| 3 | 73 | 58 | 45 | 34 | 25 | 18 | 13 | 10 | 9 | 10 | 13 | 18 | 25 | 34 | 45 | 58 |
| 4 | 80 | 65 | 52 | 41 | 32 | 25 | 20 | 17 | 16 | 17 | 20 | 25 | 32 | 41 | 52 | 65 |
| 5 | 89 | 74 | 61 | 50 | 41 | 34 | 29 | 26 | 25 | 26 | 29 | 34 | 41 | 50 | 61 | 74 |
| 6 | 100 | 85 | 72 | 61 | 52 | 45 | 40 | 37 | 36 | 37 | 40 | 45 | 52 | 61 | 72 | 85 |
| 7 | 113 | 98 | 85 | 74 | 65 | 58 | 53 | 50 | 49 | 50 | 53 | 58 | 65 | 74 | 85 | 98 |

FIG.13

| | X OFFSET | Y OFFSET | COST OFFSET | SAD COST OF COST CURVED SURFACE [0] | ABSOLUTE VALUE OF DIFFERENCE |
|---|---|---|---|---|---|
| COST FF_0 | -2 | -2 | 9 | 8 | 1 |
| COST FF_1 | -2 | -1 | 7 | 5 | 2 |
| COST FF_2 | -2 | 0 | 3 | 4 | 1 |
| COST FF_3 | 0 | -2 | 6 | 4 | 2 |
| COST FF_4 | 0 | -1 | 5 | 1 | 4 |
| COST FF_5 | 0 | 0 | 0 | 0 | 0 |
| COST FF_6 | 3 | 5 | 47 | 34 | 13 |
| COST FF_7 | 3 | -11 | 33 | (OUTSIDE OF COST CURVED SURFACE [0]) | 128 |
| COST FF_8 | -5 | -7 | 41 | 74 | 33 |
| COST FF_9 | -5 | 1 | 43 | 26 | 17 |
| COST FF_10 | 3 | -7 | 27 | 58 | 31 |
| COST FF_11 | 3 | 1 | 35 | 10 | 25 |
| COST FF_12 | -1 | -3 | 19 | 10 | 9 |
| COST FF_13 | 7 | -3 | 24 | 58 | 34 |
| COST FF_14 | -1 | -5 | 14 | 26 | 12 |
| COST FF_15 | -1 | -5 | 9 | 2 | 7 |
| COST FF_16 | -3 | -3 | 16 | 34 | 18 |
| COST FF_17 | -3 | -3 | 25 | 18 | 7 |
| COST FF_18 | -3 | -1 | 16 | 10 | 6 |
| COST FF_19 | 1 | -5 | 16 | 26 | 10 |
| COST FF_20 | 1 | -3 | 11 | 10 | 1 |
| COST FF_21 | 1 | -1 | 11 | 2 | 9 |
| COST FF_22 | -1 | -2 | 7 | 5 | 2 |
| COST FF_23 | -1 | 0 | 7 | 1 | 6 |
| | | | | APPROXIMATED VALUE | 378 |

1301

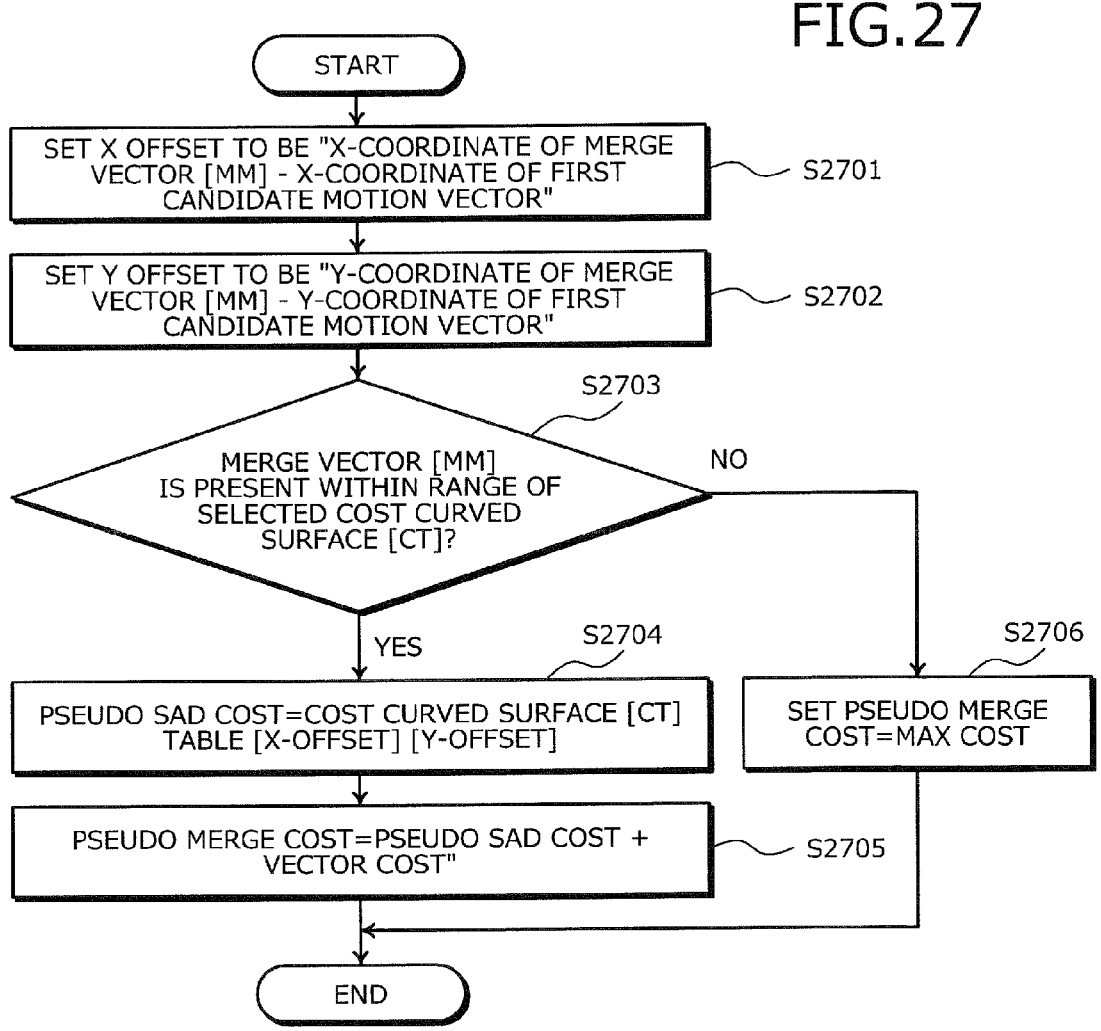

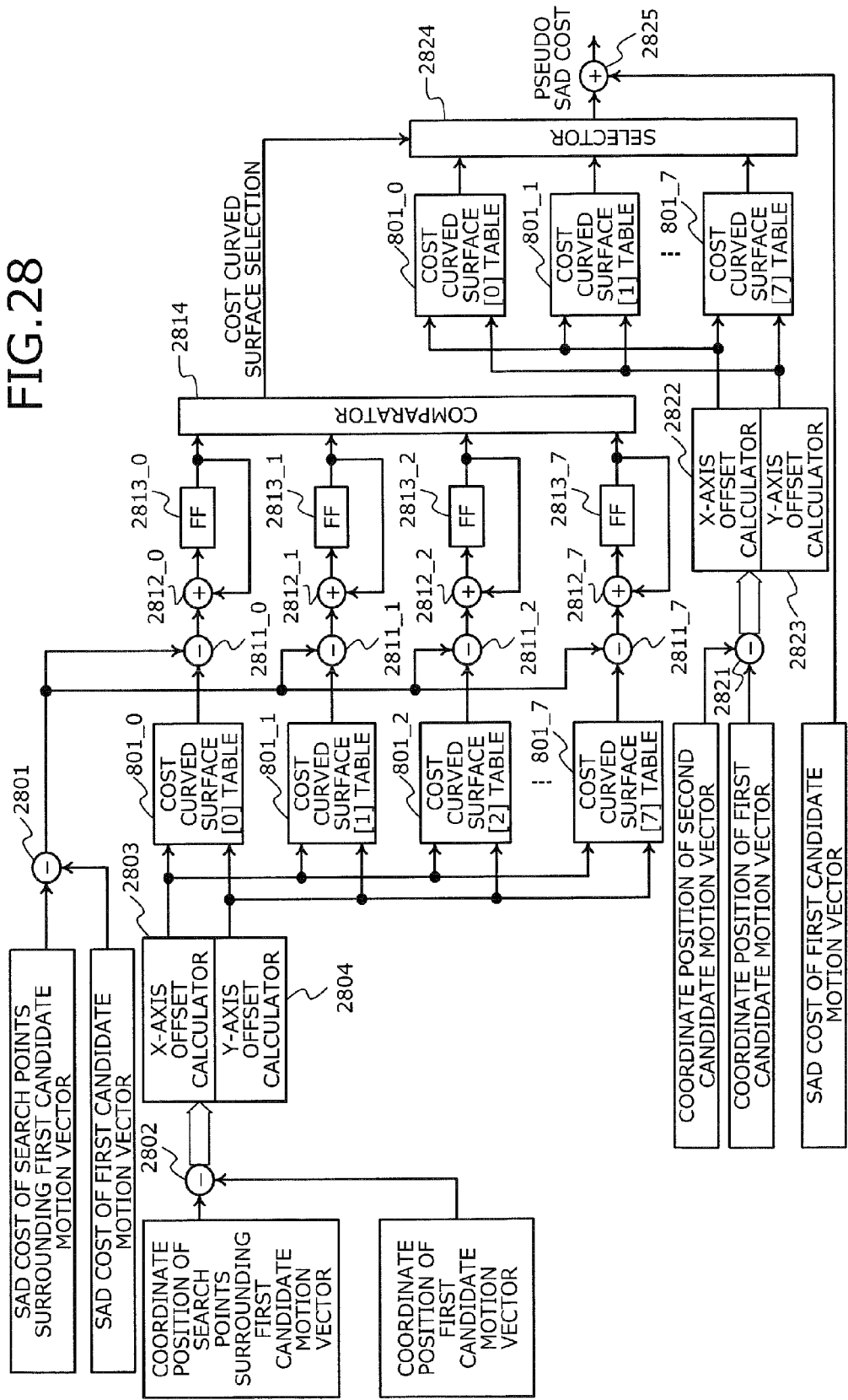

ENCODING APPARATUS, ENCODING METHOD, AND COMPUTER PRODUCT

CROSS REFERENCE TO RELATED APPLICATIONS

This application is based upon and claims the benefit of priority of the prior Japanese Patent Application No. 2013-054728, filed on Mar. 18, 2013, the entire contents of which are incorporated herein by reference.

FIELD

The embodiment discussed herein is related to an encoding apparatus, an encoding method, and a computer product.

BACKGROUND

A technique has conventionally been present for an encoding apparatus that encodes a moving image to search for a block similar to a block to be processed in an original image of the moving image. For example, the encoding apparatus acquires an evaluation value that indicates an encoding amount by comparing for each reference block of a reference image, a pixel value of the reference block and a pixel value of a block to be processed; identifies a difference in the spatial position of the reference block whose evaluation value is the most favorable and the block to be processed, as a first candidate motion vector; determines that a motion vector of a block that is adjacent to the block to be processed is a second candidate motion vector; acquires an evaluation value of the second candidate motion vector by comparing the pixel value of the reference block indicated by the second candidate motion vector and the pixel value of the block to be processed; compares the evaluation value of the first candidate motion vector and that of the second candidate motion vector; and selects the motion vector whose evaluation value is favorable.

For example, according to a related technique, an approximate high-order curved surface is produced using, as the evaluation values, a cumulative sum of absolute differences (SAD) value at the minimum position of the cumulative SAD values and plural cumulative SAD values in the vicinity of the minimum position; a local minimal value position of the approximate high-order curved surface is detected; and a motion vector at decimal-fraction precision is detected. According to another technique, in a case where it is determined whether the block to be processed is in a skip mode or a special direct mode, when no motion vector of the adjacent block can be acquired, the mode determination is pseudo executed using a motion vector of another block in the vicinity of the block to be processed (see, e.g., Japanese Laid-Open Patent Publication Nos. 2007-318578 and 2005-244503).

However, according to the conventional techniques, a process to acquire the evaluation value of the second candidate motion vector is performed and therefore, the process concerning the encoding of the moving image takes a long time. For example, when it is intended to execute in parallel the process of acquiring the evaluation value of the first candidate motion vector and that of the second candidate motion vector, plural circuits to each acquire evaluation values and plural memories to respectively store the pixel values have to be prepared and therefore, the scale of the circuit increases.

SUMMARY

According to an aspect of an embodiment, an encoding apparatus includes a processor that is configured to: calculate and store to a storage unit, an evaluation value for each candidate vector, each evaluation value being calculated based on a given block that is to be encoded among a plurality of blocks formed by dividing an original image, and a reference block on a reference image represented by each candidate vector that is a candidate motion vector of the given block; identify an evaluation value of a first candidate motion vector of the given block, based on the calculated evaluation values stored in the storage unit; calculate an evaluation value of a second candidate motion vector, based on the evaluation value of each candidate vector and the second candidate motion vector that is of the given block and selected from among motion vectors of adjacent blocks that are adjacent to the given block and among the blocks; and determine any one among the first candidate motion vector and the second candidate motion vector to be the motion vector of the given block, based on the identified, evaluation value of the first candidate motion vector and the calculated evaluation value of the second candidate motion vector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is an explanatory diagram of an example of selection of a cost curved surface;

FIG. 27 is a flowchart of an example of a procedure of a pseudo merge cost calculation process; and FIG. 28 is an explanatory diagram of an example of a circuit that calculates the pseudo SAD cost.

DESCRIPTION OF EMBODIMENTS

Embodiments of an encoding apparatus, an encoding method, and an encoding program will be described in detail with reference to the accompanying drawings.

Figure 1:
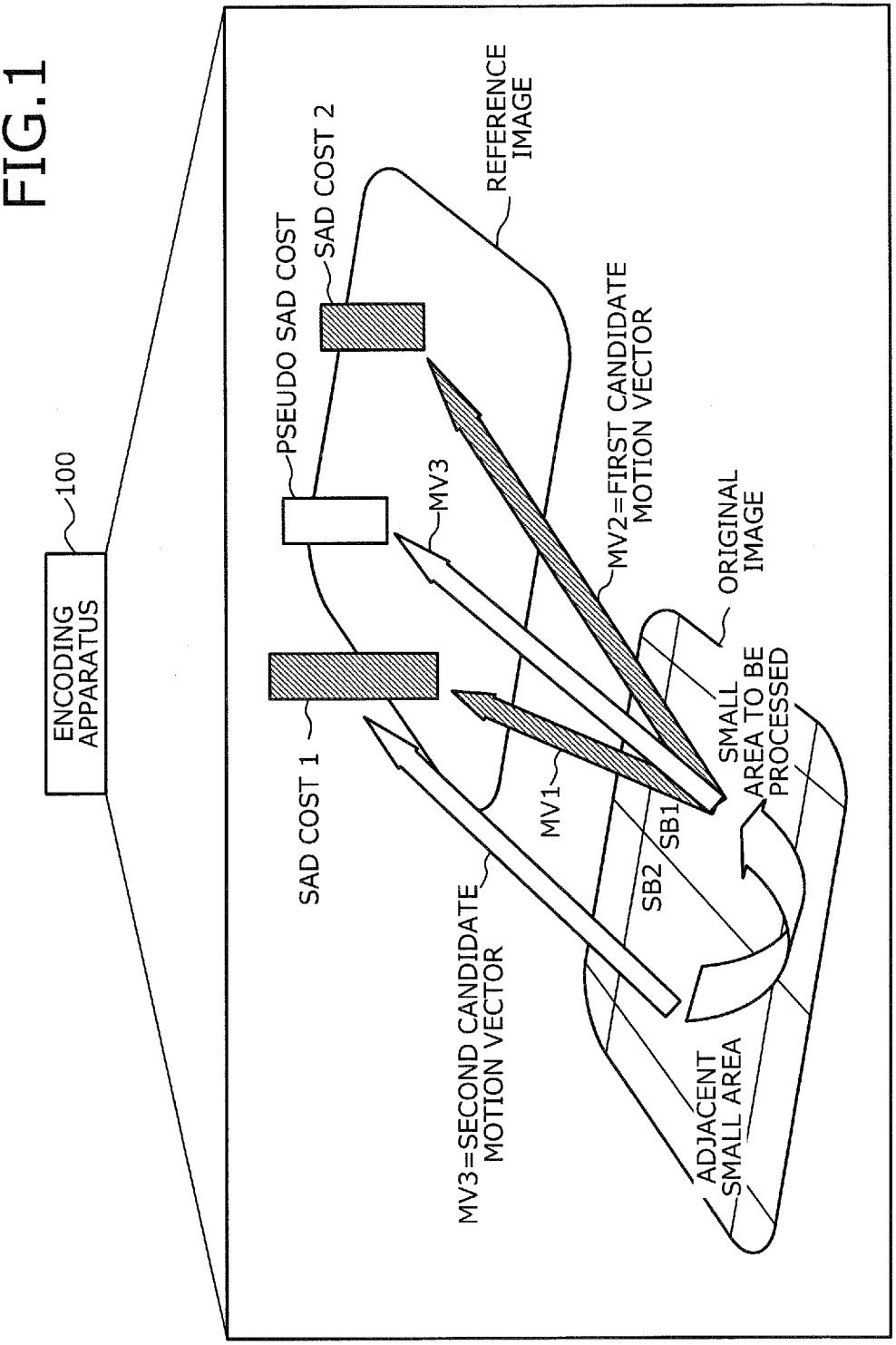
FIG. 1 is an explanatory diagram of an example of operation of an encoding apparatus according to an embodiment.

FIG. 1 is an explanatory diagram of an example of operation of an encoding apparatus according to an embodiment. The encoding apparatus 100 is a computer that encodes a moving image. The encoding apparatus 100 encodes a moving image for each block formed by dividing the image, according to Advanced video Encoding (AVC)/H.264 or High Efficiency Video Encoding (HEVC).

According to (VC/H.264, the encoding apparatus 100 divides an image into, for example, blocks each having the size of 16×16 [pixel]. According to HEVC, the encoding apparatus 100 divides an image into for example, blocks each having the size of 64×64 [pixel]. According to HEVC, the encoding apparatus 100 may further divide each block into sub blocks and may encode each small area. Hereinafter, a sub block will be referred to as "small area". In the description below, description will be made taking an example where each small area is encoded.

According to the motion prediction employed by AVC/H.264 and HEVC, items are encoded such as, information on the difference of a small area to be processed of the original image to be encoded and a reference small area of a reference image that is temporally before or after a picture to be encoded; and a motion vector that indicates the number of pixels moving from the small area to be processed to the reference small area. Thereby, the encoding amount of the small area to be processed can be reduced. Plural motion prediction modes are present for the motion prediction employed by AVC/H.264 and HEVC. For example, a skip mode is present for AVC/H.264 and a merge mode is present for HEVC as motion prediction modes that can significantly reduce the encoding amount.

In a natural image, a motion vector of a small area may have high correlativity with motion vectors around the small area. Therefore, the encoding amount of the motion vector can be reduced more by encoding a difference of the motion vector of a small area and the motion vector of a small area adjacent to the small area as compared to using the motion vector of the small area produced by the motion search as is.

Based on the skip mode, the encoding amount of the difference in the motion vectors can also be reduced by using, as is, the motion vector of a small area that is adjacent to the small area to be encoded and located on the left, above, or upper right of the small area to be encoded. Based on the merge mode, the number of types of usable motion vectors is greater as compared to that of the skip mode and therefore, the encoding efficiency can be improved further.

As described, the motion prediction modes include a non-merge mode that uses a motion vector produced by the motion search, and the skip mode and the merge mode that each use a motion vector of an adjacent small area. The encoding apparatus 100 calculates the evaluation value of the motion vector for each of the motion prediction modes and determines, for example, the motion prediction mode whose evaluation value is the least.

The evaluation value of the motion vector is calculated by cumulatively adding the values each representing a difference between corresponding pixels in the small area to be processed and the reference small area indicated by the motion vector. The evaluation value is an index to determine the degree of similarity between the small area to be processed and the reference small area. The value representing the difference between pixels is, for example, a difference in the pixel values among the pixels. A pixel value is information concerning the color shown by a pixel; and, for example, may be at least one component value of the brightness component value, the blue color difference component value, red color difference component value, etc., or may be a component value, such as the red component value, the green component value, or the blue component value. In this embodiment, the value representing the difference between the pixels is the difference between the brightness component values.

The evaluation value may be, for example, a sum of absolute differences (SAD), a sum of absolute transformed differences (SATD), or a sum of squared differences (SSD). In this embodiment, an example will be described where the evaluation value of the motion vector is the SAD. The calculated value of the SAD will be referred to as "SAD cost". A SAD cost whose value, is smaller indicates that the encoding amount of the small area to be processed becomes smaller when the corresponding motion prediction mode is selected.

When encoding is executed in the skip mode or the merge mode, the motion vector of an adjacent small area adjacent to the small area to be processed is used and therefore, the apparatus executing the encoding calculates the evaluation value of the encoding amount in the skip mode or the merge mode for each small area and in a time-sharing manner. The evaluation value will be described later. Therefore, increasing the speed by executing in parallel processes for calculating the evaluation values of adjacent small areas is difficult and impedes real-time encoding. Especially, in the merge mode based on HEVC, the number of selectable small areas increases compared to that of AVC/H.264, e.g., two types of small areas from the small areas adjacent on the left of the small area to be encoded and three types of small areas from the small areas adjacent above the small area to be encoded. Therefore, the amount of the computation to calculate the cost in the merge mode increases in proportion to the number of selectable small areas.

Parallel processing can be executed for the calculation of the SAD cost in plural merge modes for a small area. However, plural reference image memories to respectively store the pixel values to be referred to for calculating the SAD cost and plural SAD calculation circuits to respectively calculate the SAD cost need to be prepared and therefore, the scale of the circuit increases.

For the non-merge mode, the encoding apparatus 100 uses the reference image memory and the SAD calculation circuit to calculate the SAD cost for each candidate vector among candidates of motion vectors, and identifies a first candidate motion vector from among the candidate vectors. The encoding apparatus 100 calculates a pseudo SAD cost based on a second candidate motion vector selected from among the motion vectors of the adjacent small areas and the SAD cost of each of the candidate vectors. The pseudo SAD cost is not the SAD cost calculated using the reference image memory and the SAD calculation circuit but is a SAD cost predicted from the second candidate motion vector and the SAD cost of each of the candidate vectors.

As described, the reference image memory and the SAD calculation circuit are not used for the calculation of the pseudo SAD cost and therefore, the encoding apparatus 100 can execute the SAD cost calculation in the non-merge mode and the pseudo SAD cost calculation in the merge mode, in parallel and without increasing the scale of the circuit. In the skip mode, the encoding apparatus 100 can also execute in parallel the pseudo SAD cost calculation in the skip mode and the SAD cost calculation in the non-merge mode. An example for the merge mode will be described below.

In FIG. 1, the encoding apparatus 100 calculates the SAD cost for each candidate vector of a small area SB1 to be processed; hatched arrows represent the candidate vectors; and hatched rectangles schematically represent the SAD costs of the candidate vectors and a vertically longer rectangle represents a greater SAD cost. For example, the encoding apparatus 100 calculates SAD costs 1 and 2 respectively for candidate vectors MV 1 and 2. Based on the SAD costs 1 and 2, in the example of FIG. 1, the encoding apparatus 100 identifies the candidate vector MV2 whose value of the SAD cost is smaller as the first candidate motion vector.

The encoding apparatus 100 selects a motion vector MV3 of an adjacent small area SB2 to be the second candidate motion vector, from among the motion vectors of the adjacent small areas adjacent to the small area SB1 to be processed; and calculates the pseudo SAD cost for the motion vector MV3 based on the motion vector MV3 and the SAD costs 1 and 2 respectively for the candidate vectors MV1 and MV2.

According to a first example of the calculation of the pseudo SAD cost, the encoding apparatus 100 calculates a distance D1 between a coordinate position of the motion vector MV3 and that of the candidate vector MV1, and a distance D2 between a coordinate position of the motion vector MV3 and the candidate vector MV2; and calculates the pseudo SAD cost as in Eq. (1) below.

$$\text{pseudo SAD cost} = ((1/\text{distance } D1)*\text{SAD cost } 1 + (1/\text{distance } D2)*\text{SAD cost } 2)/((1/\text{distance } D1) + (1/\text{distance } D2)) \quad (1)$$

Eq. (1) expresses a weighted average using the inverse of the distance as the weight. According to a second example of the calculation of the pseudo SAD cost, when three or more candidate vectors are present, the encoding apparatus 100 may extract three candidate vectors that are close to the motion vector MV3 from the overall candidate vectors; and may calculate the weighted average using the inverse of the distance as the weight. According to a third example of the calculation of the pseudo SAD cost, in a spatial coordinate system having an X-axis and a Y-axis that represent the coordinate position of a candidate vector and a Z-axis that represents the SAD cost of the candidate vector, the encoding apparatus 100 may store surface data that are each formed by the SAD cost; may select the surface data that is closest to the surface formed by the SAD cost of the candidate vector; and may determine that the SAD cost of the coordinate position of the motion vector MV3 in the selected surface data is the pseudo SAD cost.

After calculating the pseudo SAD cost, based on the SAD cost of the non-merge mode and the pseudo SAD cost of the merge mode, the encoding apparatus 100 determines any one of the candidate vectors MV2 and MV3 to be the motion vector of the small area SB1 to be processed. The details of the encoding apparatus 100 will be described with reference to FIGS. 2 to 28.

An example will be described of hardware of a computer system 200 to which the encoding apparatus 100 is applied. The computer system 200 is, for example, a system having functions of recording and reproducing moving images and is, for example, a personal computer, a television, a recorder, a smartphone, a video camera, or a digital camera.

Figure 2:
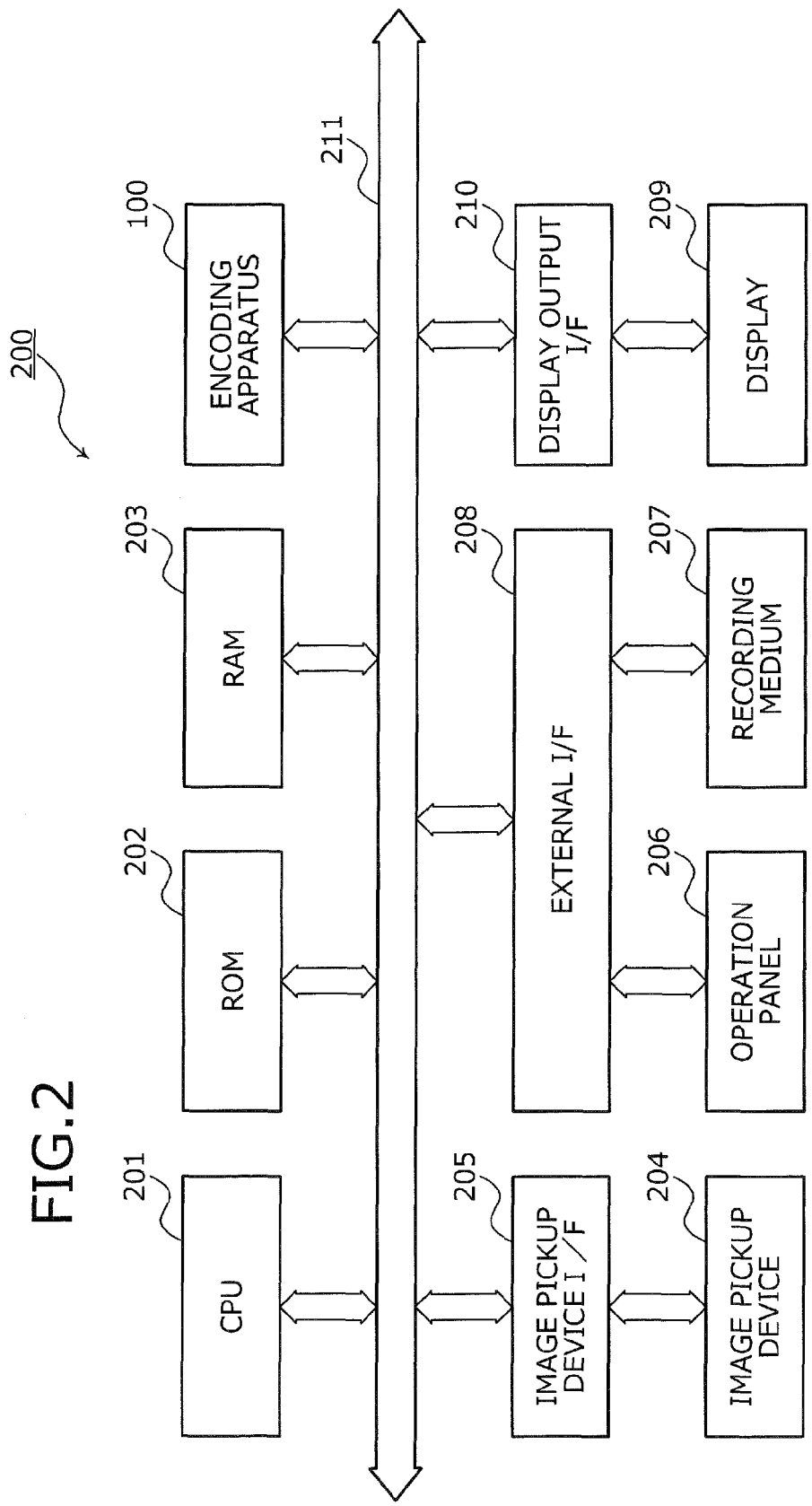
FIG. 2 is a block diagram of an example of hardware of a computer system.

FIG. 2 is a block diagram of an example of the hardware of the computer system. In FIG. 2, the computer system 200 includes a central processing unit (CPU) 201, a read-only memory (ROM) 202, a random access memory (RAM) 203, an image pickup device 204, an image pickup device interface (I/F) 205, an operation panel 206, a recording medium 207, an external I/F 208, and the encoding apparatus 100.

The computer system 200 also includes a display 209, and a display output I/F 210. The units from the CPU 201 to the RAM 203, the image pickup device I/F 205, the external I/F 208, the display output I/F 210, and the encoding apparatus 100 are connected to each other by a bus 211.

The CPU 201 is a processing unit that supervises the control of the computer system 200 overall. The ROM 202 is a non-volatile memory that stores programs such as a boot program for the computer system 200. The RAM 203 is a volatile memory used as a work area of the CPU 201.

The image pickup device 204 is an apparatus that converts light emitted from an object into an electronic signal. For example, the image pickup device 204 is a charge coupled device (CCD) image sensor or a complementary metal oxide semiconductor (CMOS) image sensor.

The image pickup device I/F 205 is an apparatus that controls the image pickup device 204 during recording; thereby, converts the format of a signal from the image pickup device 204 into a signal in a predetermined image format; and stores the converted signal into the RAM 203. The "predetermined image format" is, for example, the YUV 420. The signal from the image pickup device 204 complies with, for example, the RGB Bayer format.

The operation panel 206 refers to a liquid crystal touch panel and the operation buttons included in the computer system 200. The recording medium 207 is a storage apparatus such as a flash ROM, and may store a moving image encoding program according to this embodiment. The external I/F 208 controls the operation panel 206 and the recording medium 207, and may be connected to external apparatuses outside the computer system 200 through a network such as a local area network (LAN), a wide area network (WAN), or the Internet via a communication line.

The display 209 displays the image format recorded by the image pickup device 204. The display output I/F 210 controls the display 209.

Figure 3:
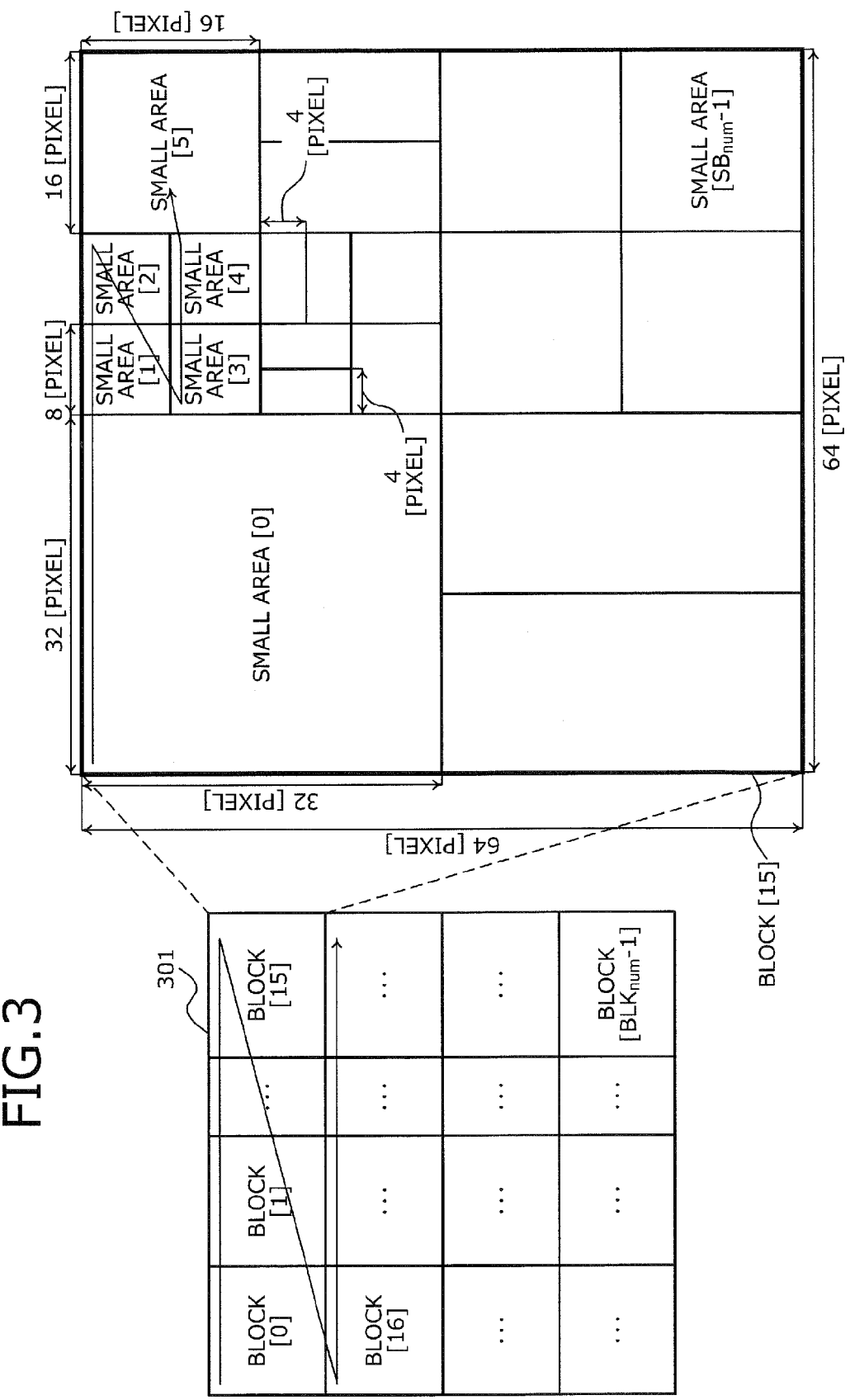
FIG. 3 is an explanatory diagram of an example of a relation between a picture and a block.

FIG. 3 is an explanatory diagram of an example of the relation between a picture and a block. The encoding apparatus 100 executes an encoding process for a picture according to, for example, the raster order of blocks, which each have a specific size, from an upper left block to a lower right block. The size of the block is, for example, 16×16 [pixel] for AVC/H.264 and 64×64 [pixel] for HEVC. When the encoding process is started for one picture, the encoding apparatus 100 executes the encoding process with respect to each block, in the raster order, where the encoding for a block [0] is executed and that for the next block [1] is executed. The encoding apparatus 100 executes the motion prediction for each small area formed by further dividing each one block.

In the example of FIG. 3, the encoding apparatus 100 divides a picture 301 into $BLK_{num}$ blocks such as the blocks [0], [1], . . . , and [$BLK_{num}$−1] and executes the encoding process in the raster order. The size of each of the blocks [0], [1], . . . , and [$BLK_{num}$−1] is 64×64 [pixel].

The encoding apparatus 100 executes the motion prediction for each small area formed by further dividing each block into plural small areas. In the example of FIG. 3, for the block [15], the encoding apparatus 100 further divides the block [15] into plural small areas and executes the motion prediction for each of the $SB_{num}$ small areas among the small areas [0] to [$SB_{num}$−1]. The size of the small area [0] is 32×32 [pixel]. The size of each of the small areas [1] to [4] is 8×8 [pixel]. The size of the small area [5] is 16×16 [pixel]. The encoding apparatus 100 according to this embodiment executes motion search processes for the plural small areas in parallel to increase the speed of the process.

Figure 4:
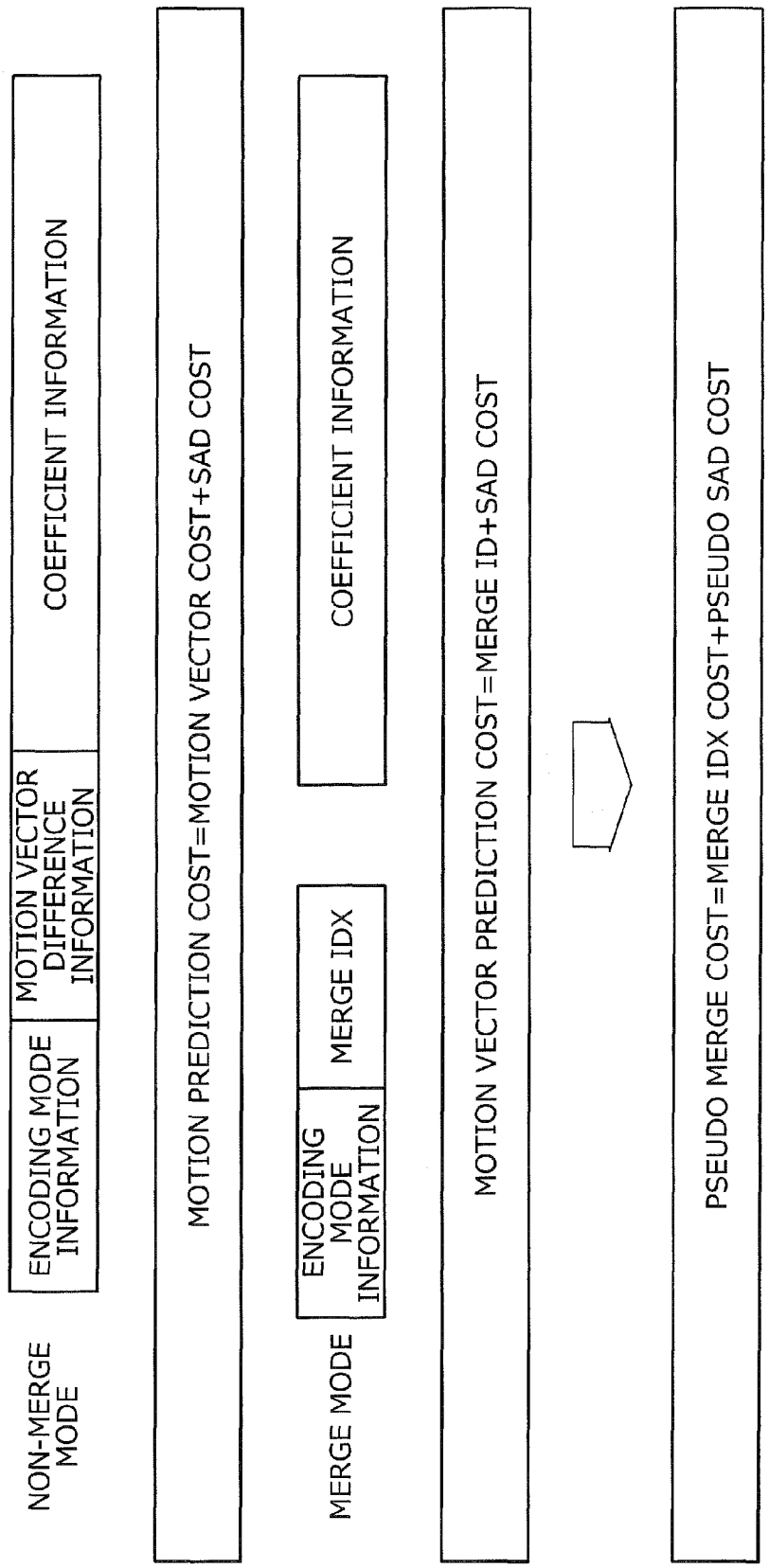
FIG. 4 is an explanatory diagram of an example of the encoding amount and motion prediction cost of a non-merge, mode and a merge mode, respectively.

FIG. 4 is an explanatory diagram of an example of the encoding amount and the motion prediction cost of the non-merge mode and the merge mode, respectively. The encoding amount in the non-merge mode is the sum of the encoding amount of encoding mode information, the encoding amount of motion vector difference information, and the encoding amount of coefficient information. The "encoding mode information in the non-merge mode" refers to information indicating forward prediction or backward prediction, information indicating which the number of the reference surface, etc. The "motion vector difference information" indicates the difference of the motion vector of an adjacent small area and that of the small area to be processed. The "coefficient information in the non-merge mode" is information indicating the difference of the pixel group of the block to be processed and the pixel group of the reference block indicted by the motion vector difference information.

The "motion prediction cost in the non-merge mode" is defined as the sum of the motion vector cost and the SAD cost. The "motion vector cost" is the encoding amount of the motion vector difference information. For example, the motion vector difference information may be a bit length obtained by converting the motion vector difference information according a conversion table used for arithmetic encoding, etc., or may be the bit length before the conversion. The "SAD cost" in the non-merge mode is the value of the SAD of the first candidate motion vector resulting from the motion search.

The "encoding amount in the merge mode" is the sum of the encoding amount of the encoding mode information, the encoding amount of a merge IDX, and the encoding amount of the coefficient information. The "encoding mode information in the merge mode" is a flag indicating whether the mode is the merge mode. The "merge IDX" is identification information to identify a merge vector. The "coefficient information in the merge mode" is information on the difference of the pixel group of the block to be processed and the pixel group of the reference block indicated by the merge vector identified by the merge IDX. Though not depicted in FIG. 4, the encoding amount in the skip mode is the encoding amount of the encoding mode information.

The motion prediction cost in the merge mode is defined as the sum of the merge IDX cost and the SAD cost. The "merge IDX cost" is the encoding amount of the merge IDX. The "SAD cost of the merge mode" is the SAD of the second candidate motion vector selected from the plural merge vectors.

The reference image memory and the SAD calculation circuit are used to calculate the SAD cost of the merge mode and therefore, plural reference image memories and plural SAD calculation circuits has to be prepared to execute this calculation in parallel with the calculation of the SAD cost in the non-merge mode. However, in this embodiment, the encoding apparatus 100 calculates a pseudo merge cost as the motion prediction cost in the merge mode. The pseudo merge cost is defined as the total of the merge IDX cost and the pseudo SAD cost.

Figure 5:
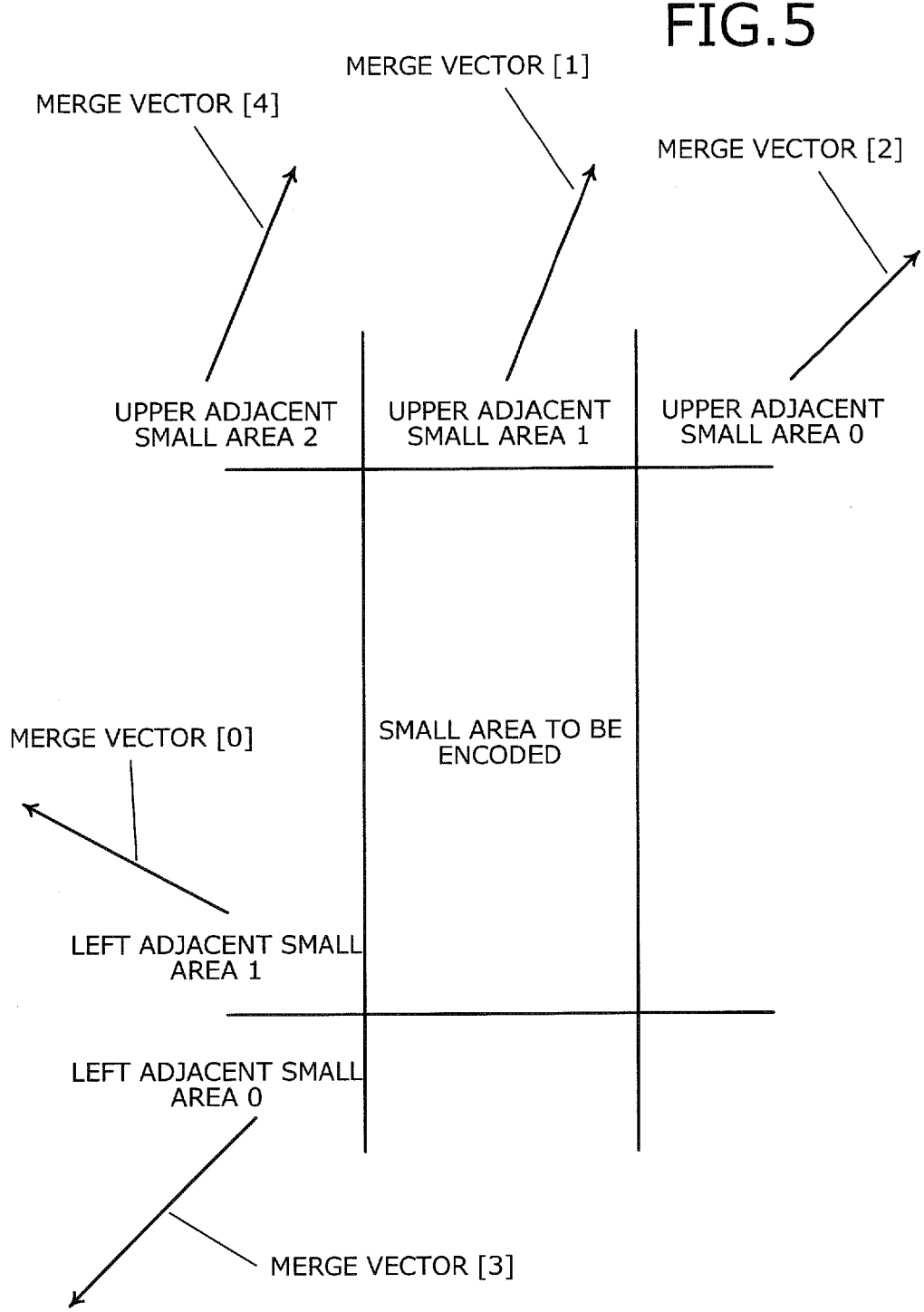
FIG. 5 is an explanatory diagram of an example of use of motion vectors of adjacent blocks in the merge mode.

FIG. 5 is an explanatory diagram of an example of use of the motion vectors of the adjacent blocks in the merge mode. As depicted in FIG. 5, the merge mode based on HEVC enables selection from five types of areas, including left adjacent small areas 0 and 1 that are adjacent to and on the left of a small area that is to be encoded, and upper adjacent small areas 0, 1, and 2 that are adjacent to and above the small area that is to be encoded. In this embodiment, it is assumed that the number of merge modes $MM_{num}$ is five, and the merge modes [0] to [4] are set as below.

For example, a mode using the motion vector of the left adjacent small area 1 as the merge, mode will be referred to as "merge mode [0]"; the motion vector of an adjacent block will be referred to as "merge vector"; and, for example, the motion vector of the left adjacent small area 1 will be referred to as "merge vector [0]".

A mode using the motion vector of the upper adjacent small area 1 as a merge mode will be referred to as "merge mode [1]". The motion vector of the upper adjacent small area 1 will be referred to as "merge vector [1]". A mode using the motion vector of the upper adjacent small area 0 as a merge mode will be referred to as "merge mode [2]". The motion vector of the upper adjacent small area 0 will be referred to as "merge vector [2]". A mode using the motion vector of the left adjacent small area 1 as a merge mode will be referred to as "merge mode [3]". The motion vector of the left adjacent small area 0 will be referred to as "merge vector [3]". A mode using the motion vector of the upper adjacent small area 2 as a merge mode will be referred to as "merge mode [4]". The motion vector of the upper adjacent small area 2 will be referred to as "merge vector [4]".

Figure 6:
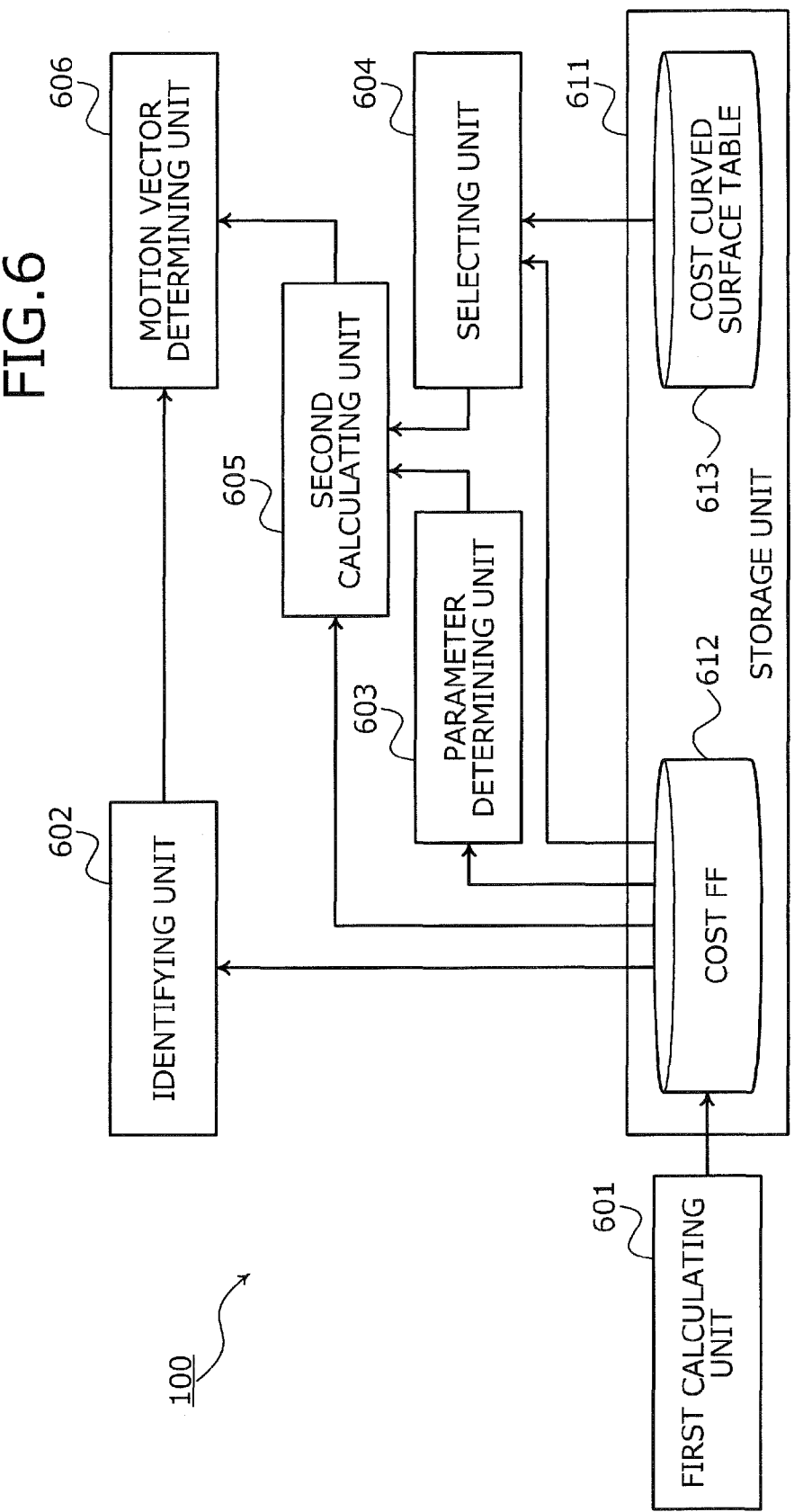
FIG. 6 is a block diagram of an example of functions of the encoding apparatus.

Functions of the encoding apparatus 100 will be described. FIG. 6 is a block diagram of an example of functions of the encoding apparatus. The encoding apparatus 100 includes a first calculating unit 601, an identifying unit 602, a parameter determining unit 603, a selecting unit 604, a second calculating unit 605, and a motion vector determining unit 606.

Functions of the first calculating unit 601 to the motion vector determining unit 606 may be implemented by executing on the CPU 201, programs stored in a storage apparatus. The storage apparatus is, for example, the ROM 202, the RAM 203, or the recording medium 207 depicted in FIG. 2.

The encoding apparatus 100 can access a storage unit 611. The storage unit 611 is stored in the storage apparatus such as the ROM 202, the RAM 203, or the recording medium 201. The storage unit 611 includes a cost flip-flop (FF) 612 and a cost curved surface table 613. The cost FF 612 and the cost curved surface table 613 may reside in the same storage apparatus or different storage apparatuses.

The cost FF 612 stores the SAD cost calculated for each candidate vector. The details of the contents of the cost FF 612 will be described later with reference to FIG. 7.

In a spatial coordinate system having three axes described below, the cost curved surface table 613 stores surface data that each indicate a surface formed when the SAD cost is arranged for each vector that is a candidate motion vector of a small area to be processed. The surface formed when the SAD cost is arranged for each vector will be referred to as "cost curved surface". The three axes described below are first and second axes that represent the coordinate position on the reference image indicated by the vector to be the candidate motion vector of the small area to be processed; and a third axis that represents the SAD cost of the vector. The details of the contents of the cost curved surface table 613 will be described later with reference to FIG. 8.

The first calculating unit 601 calculates the SAD cost for each candidate vector, based on the small area that is to be processed and encoded among the plural small area and the reference small area on the reference image indicated by each of the candidate vectors that are the candidate motion vectors of the small area to be processed, and stores the calculated SAD cost in the cost FF 612. For example, the first calculating unit 601 cumulatively adds the absolute values of the difference of the brightness component value of each pixel of the small area to be processed and the brightness component value of each pixel of the reference small area indicated by each candidate vector and thereby, calculates the SAD cost for each candidate vector, and stores the calculated SAD cost to the cost FF 612.

The first calculating unit 601 may calculate the SAD cost for each candidate vector present within a predetermined distance of the candidate vector having the lowest value among the SAD costs calculated for the candidate vectors and may overwrite the contents of the cost FF 612 therewith. The "predetermined distance" is specified by a development engineer of the encoding apparatus 100 or a user of the computer system 200. For example, if a large value is specified as the predetermined distance, the time consumed for the encoding increases, although the encoding amount may be reduced.

For example, it is assumed that the first calculating unit 601 calculates the SAD cost for each candidate vector at the full-pel precision and stores the calculated SAD cost in the contents of the cost FF 612. The first calculating unit 601 calculates the SAD cost for each candidate vector at half-pel precision within the predetermined distance from the candidate vector having the SAD cost that is lowest among the stored candidate vectors, and overwrites the contents of the cost FF 612 therewith. The first calculating unit 601 may calculate the SAD cost for each candidate vector at quarter-pel precision and may overwrite the contents of the cost FF 612 therewith.

The identifying unit 602 identifies the SAD cost of the first candidate motion vector of the small area to be processed, based on the SAD cost for each candidate vector stored in the cost FF 612 by the first calculating unit 601. For example, the identifying unit 602 identifies the SAD cost of the first candidate motion vector using, as the first candidate motion vector, the candidate vector whose SAD cost is the lowest among the candidate vectors stored in the cost FF 612. The identified SAD cost is stored in the storage apparatus such as the flip-flop.

The parameter determining unit 603 determines the values of parameters of the function model by substituting in a function model, the coordinate position of each candidate vector stored in the cost FF 612 and the SAD cost of each candidate vector. The "function model" expresses the SAD cost of the vector using the coordinate position in the reference image indicated by the vector to be the candidate motion vector of the small area to be processed, and the parameters. For example, it is assumed that the function model is Eq. (2) below.

$$\text{SAD cost} = a \times x^2 + b \times y^2 + c \quad (2)$$

Where, "a", "b", and "c" are parameters and "x" and "y" respectively are the X-coordinate and the Y-coordinate of the reference image indicated by the vector. In this case, the parameter determining unit 603 determines the values of a, b, and c by substituting x, y, and the SAD cost with the coordinate position of each candidate vector stored in the cost FF 612 and the SAD cost of each candidate vector. According to a specific determination method, for example, the parameter determining unit 603 determines the values of a, b, and c using the least-square method. The determined values of the parameters are stored to the storage apparatus such as the flip-flop.

The selecting unit 604 selects any one cost curved surface from the plural cost curved surfaces, based on each of the plural cost curved surfaces stored in the cost curved surface table 613 and the SAD cost of each candidate vector stored in the cost FF 612.

For example, for a cost curved surface among the plural cost curved surfaces, the selecting unit 604 identifies the coordinate position having the SAD cost that is the lowest, and the coordinate position of the candidate vector having the SAD cost that is the lowest among the candidate vectors stored in the cost FF 612. Corresponding to the candidate vector stored in the cost FF 612, the selecting unit 604 calculates an absolute value of the difference of the SAD cost of the cost curved surface corresponding to the coordinate position of the candidate vector and the SAD cost of the candidate vector. The selecting unit 604 may use the square of the difference instead of the absolute value of the difference; and may calculate the absolute value of the difference for each of all the candidate vectors stored in the cost FF 612 or may calculate the absolute value of the difference for the candidate vectors present within the predetermined range from the coordinate position of the candidate vector that is the lowest.

The selecting unit 604 cumulatively adds the absolute values of the differences and thereby, calculates approximated values of the SAD costs for the cost curved surface and each candidate vector, calculates for each cost curved surface the approximated value of the SAD cost of each candidate vector, and selects the cost curved surface having the lowest approximated value. The identification information of the selected cost curved surface is stored to a storage apparatus such as a flip-flop.

The second calculating unit 605 calculates the pseudo SAD cost of the second candidate motion vector based on the second candidate motion vector of the small area to be processed and the SAD cost of each candidate vector, the second candidate motion vector being selected from among the motion vectors of the adjacent small areas that are adjacent to the small area to be processed among plural small areas. For example, the second calculating unit 605 calculates the pseudo SAD cost of the second candidate motion vector based on the weighted average using, as the weight, the inverse of the distance between the coordinate position of the second candidate motion vector and the coordinate position of the candidate vector.

The second calculating unit 605 may calculate the pseudo SAD cost of the second candidate motion vector based on the second candidate motion vector and surface data selected by the selecting unit 604, or may calculate the pseudo SAD cost of the second candidate motion vector by substituting the coordinate position of the second candidate motion vector in the function model using the values of the parameters determined by the parameter determining unit 603. The calculated pseudo SAD cost is stored in a storage apparatus such as a flip-flop.

The motion vector determining unit 606 determines any one among the first candidate motion vector and the second candidate motion vector to be the motion vector of the small area to be processed, based on the SAD cost of the first candidate motion vector and the pseudo SAD cost of the second candidate motion vector.

For example, the motion vector determining unit 606 determines the candidate motion vector corresponding to the smaller of the SAD cost of the first candidate motion vector and the pseudo SAD cost of the second candidate motion vector to be the motion vector of the small area to be processed. The motion vector determining unit 606 may determine the second candidate motion vector to be the motion vector of the small area to be processed when the value of the SAD cost of the first candidate motion vector and that of the pseudo SAD cost of the second candidate motion vector are equal to each other.

The motion vector determining unit 606 calculates a motion prediction cost by adding the motion vector cost to be the encoding amount of the first candidate motion vector and the SAD cost of the first candidate motion vector; and also calculates the pseudo merge cost by adding the merge IDX cost to be the encoding amount of the second candidate motion vector and the pseudo SAD cost of the second candidate motion vector. If the motion prediction cost is smaller than the pseudo merge cost, the motion vector determining unit 606 determines the first candidate motion vector to be the motion vector of the small area to be processed; and when the motion prediction cost is greater than the pseudo merge cost, the motion vector determining unit 606 determines the second candidate motion vector to be the motion vector of the small area to be processed. The determined motion vector is stored to a storage apparatus such as a flip-flop.

Figure 7:
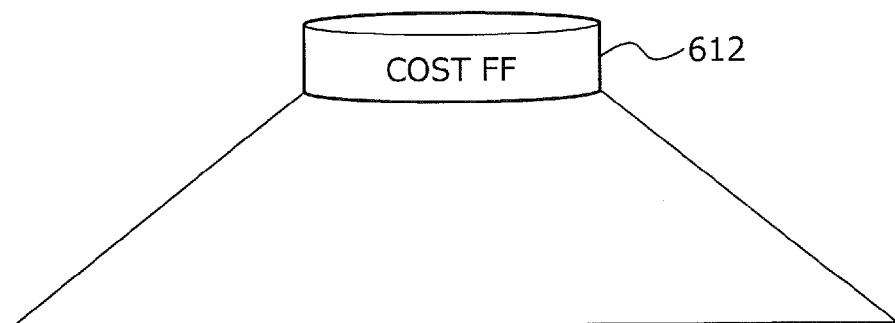
FIG. 7 is an explanatory diagram of an example of the contents of a cost FF.

FIG. 7 is an explanatory diagram of an example of the contents of the cost FF. The cost FF 612 is a flip-flop that stores the SAD cost calculated for each candidate vector. The cost FF 612 depicted in FIG. 7 includes cost FFs FF_0 to FF_23. The cost FF 612 has three fields for MV_X, MV_Y, and the SAD cost. The MV_X and MV_Y fields respectively store the X-coordinate and the Y-coordinate of the candidate vector. The SAD cost field stores the SAD cost of the candidate vector represented by the values stored in the MV_X and MV_Y fields.

For example, the cost FF FF_0 stores "82" as the SAD cost of the candidate vector to be at (32, 24).

Figure 8:
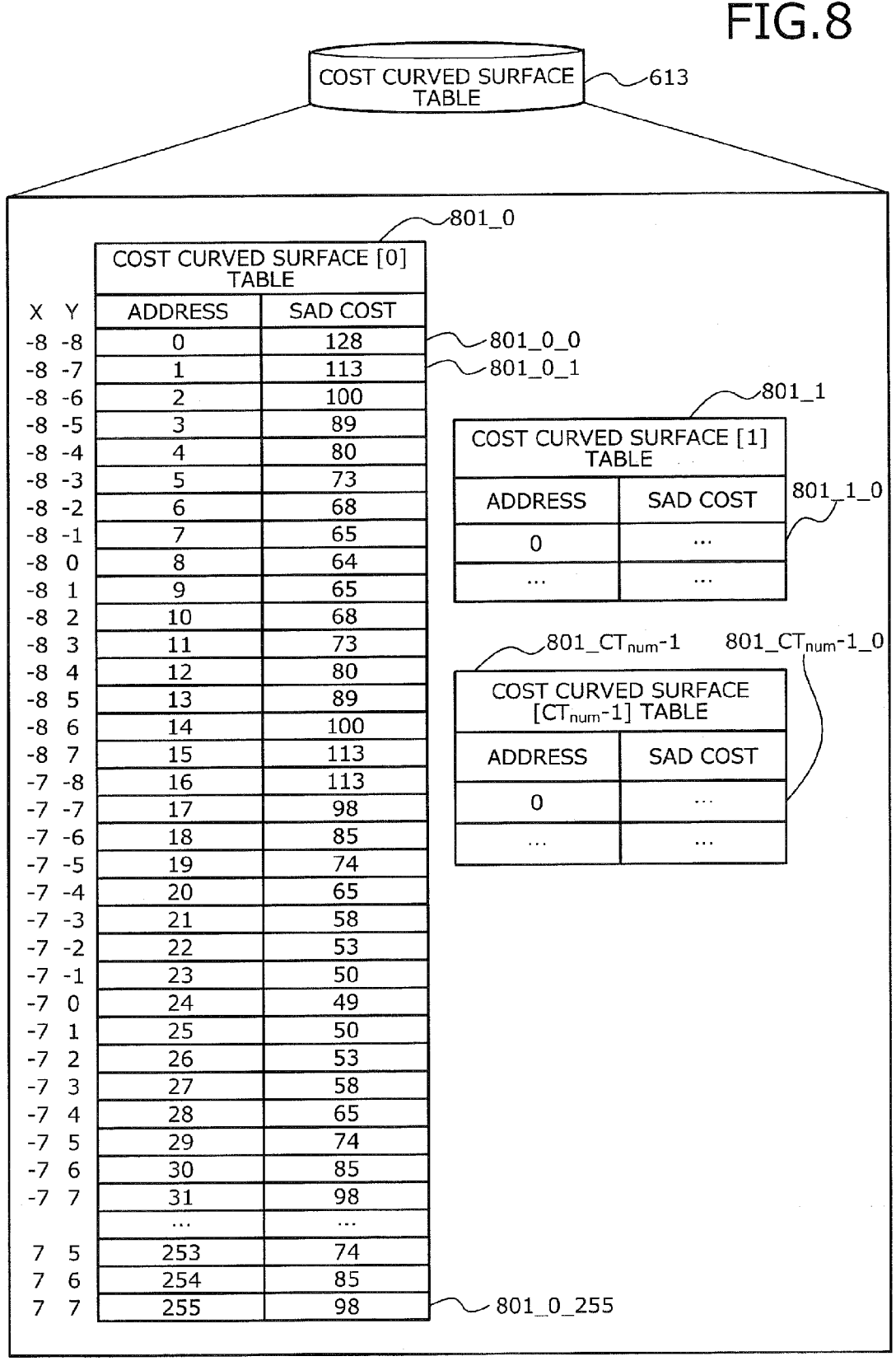
FIG. 8 is an explanatory diagram of an example of the contents of a cost curved surface table.

FIG. 8 is an explanatory diagram of an example of the contents of the cost curved surface table. The cost curved surface table 613 is a table that stores the SAD cost for each cost curved surface. The cost curved surface table 613 depicted in FIG. 8 includes $CT_{num}$ tables: a cost curved surface [0] table 801_0, a cost curved surface [1] table 801_1, ..., and a cost curved surface [$CT_{num}$-1] table 801_$CT_{num}$-1. For example, the cost curved surface [0] table 801_0 includes records 801_0_0, 801_0_1, ..., and 801_0_255. The cost curved surface [1] table 801_1 includes a record 801_1_0. The cost curved surface [$CT_{num}$-1] table 801_$CT_{num}$-1 includes a record 801_$CT_{num}$-1_0.

The cost curved surface table 613 has two fields for the address and the SAD cost. The address field stores a value that can uniquely be identified from the X-coordinate and the Y-coordinate on the cost curved surface. The SAD cost field stores the SAD cost at the corresponding address. For example, the record 801_0_0 indicates that the SAD cost is 128 for the address "0" whose X-coordinate is −8 and whose Y-coordinate is −8.

Figure 9:
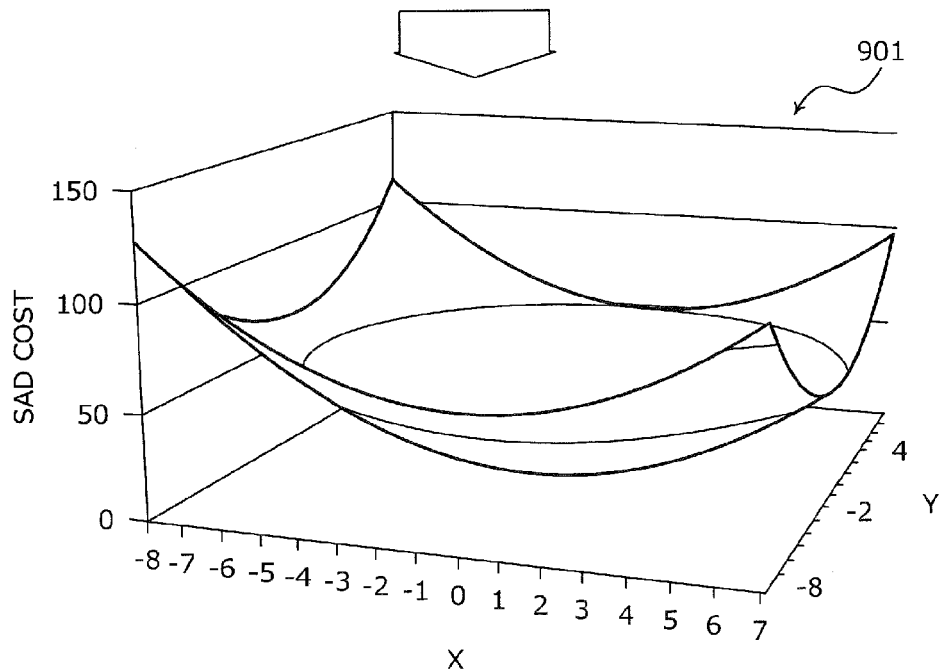
FIG. 9 is an explanatory diagram of an example where the contents of a cost curved surface [0] table is depicted as a graph.

FIG. 9 is an explanatory diagram of an example where the contents of the cost curved surface [0] table is depicted as a graph. In FIG. 9, the cost curved surface [0] table 801_0 is depicted as a 3-D graph 901. The cost curved surface [0] is a curved surface expressed by "SAD cost=$X^2+Y^2$". For example, a curved surface that is expressed by an equation obtained by adding a constant to "$X^2+Y^2$" is registered into the curved surface table 613 as a first example of another cost curved surface. For example, a curved surface whose slope is gentler than that of the cost curved surface "0" and a curved surface whose slope is steeper than that of the cost curved surface [0] are registered into the cost curved surface table 613 as second examples of the cost curved surface.

The motion search process in the non-merge mode will be described with reference to FIGS. 10 to 12. For the motion search, for example, hexagonal search, diamond search, and overall search are present. In this embodiment, an example where the hexagonal search is employed will be described. When a trace search represented by hexagonal search is employed, the number records of the cost FF 612 retaining the SAD costs can be reduced by overwriting the cost FF 612. On the other hand, when an overall search is employed, the cost minimal position may be overwritten midway and therefore, records corresponding to all the search points need to be prepared in the cost FF 612.

The encoding apparatus 100 initially calculates the SAD cost at each of seven search points as the hexagonal search. If the SAD cost of the central search point is not the lowest, the encoding apparatus 100 calculates the SAD cost using, as the search points, the vertices of a new hexagon centered about the search point whose SAD cost is the lowest. If the SAD cost of the central search point is the lowest, the encoding apparatus 100 causes the hexagonal search to come to an end and executes a cross four-point search. The process steps from start up of the hexagonal search by the encoding apparatus 100, to the end of the hexagonal search will be described with reference to FIG. 10.

The encoding apparatus 100 calculates the SAD costs of the four search points positioned above, below, and on the left and the right of the center of the hexagon as the cross four-point search, and executes a half-pel search centered about the search point whose SAD cost is the lowest among the four search points. The process steps up to that at which the encoding apparatus 100 executes the cross four point search and the half-pel search will be described with reference to FIG. 11.

After the half-pel search, the encoding apparatus 100 executes quarter-pel search centered about the search point whose SAD cost is the lowest among the search points of the half-pel search After the quarter-pel search, the position whose SAD cost is the lowest is the first candidate motion vector and the motion search result. The process steps up to that at which the encoding apparatus 100 executes the quarter-pel search and calculates the first candidate motion vector will be described with reference to FIG. 12.

Figure 10:
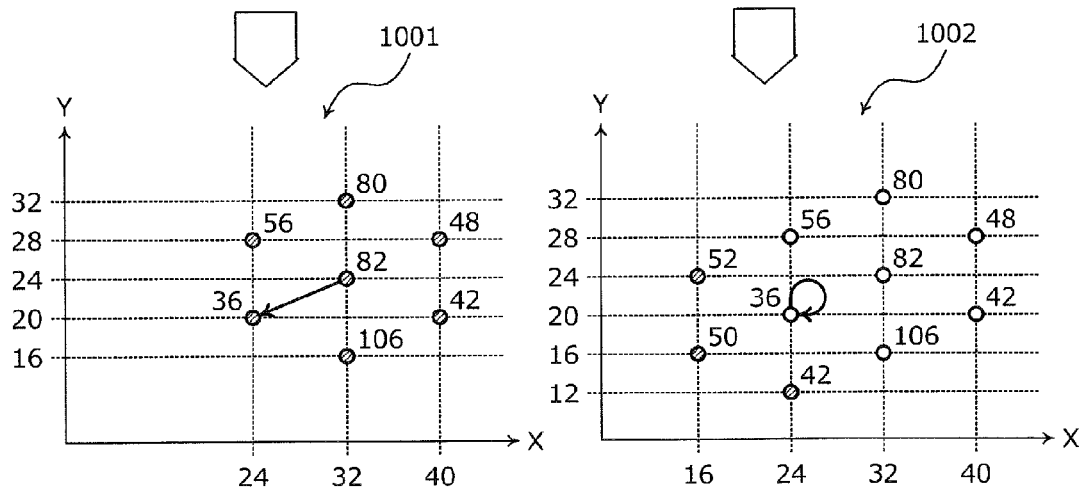
FIG. 10 is an explanatory diagram (Part I) of an example of a motion search process in the non-merge mode.

FIG. 10 is an explanatory diagram (Part I) of an example of the motion search process in the non-merge mode. As depicted in (A) of FIG. 10, the encoding apparatus 100 calculates the SAD cost at seven search points, respectively, as the hexagonal search. In the example of FIG. 10, the encoding apparatus 100 calculates the SAD cost at each of the seven search points, including the central search point (32, 24) and surrounding search points (32, 16), (32, 32), (40, 20), (40, 28), (24, 20), and (24, 28). After the calculation, the encoding apparatus 100 stores the X-coordinate and the Y-coordinate of the candidate motion vector to reach the search point and the calculated SAD cost thereof into one record of the cost FF 612. In the example of FIG. 10, the encoding apparatus 100 stores the X-coordinate and the Y-coordinate of the candidate motion vector of each of the seven search points and the calculated SAD costs into the cost FFs FF_0 to FF_6.

An X-Y plane 1001 represents the position relations of the seven search points and the SAD costs thereof. In the X-Y plane 1001, and X-Y planes 1002, 1101, 1102, and 1201 described later, each search point plotted using a circle represents a search point for full-pel units. Each search point plotted using a square represents a search point for half-pel units. Each search point plotted using a triangle represents a search point for quarter-pel units. Each hatched search point represents a search point added in the corresponding search.

As represented by the X-Y plane 1001, the search point having the SAD cost of "36" that is the lowest among the seven search points is at (24, 20) and is not the central search point. Therefore, as depicted in (B) of FIG. 10, the encoding apparatus 100 newly calculates SAD costs of three search points that are at (24, 12), (16, 16), and (16, 24), using the search point at (24, 20) as a central search point. In this manner, for a hexagon, the previously evaluated points are included and therefore, the SADs are newly calculated for three search points. The encoding apparatus 100 stores the X-coordinate and the Y-coordinate of the candidate motion vector of each of the three search points and the calculated SAD costs into the cost FFs FF_7 to FF_9.

The X-Y plane 1002 represents the position relations of the three search points and the SAD costs thereof in addition to the state of the X-Y plane 1001. As represented by the X-Y plane 1002, the search point having the SAD cost of "36" is the lowest among the central search point and the six search points surrounding the central search point, which is at (24, 20), and is the central search point. Therefore, the encoding apparatus 100 causes the hexagonal search to come to an end and executes the cross four-point search.

Figure 11:
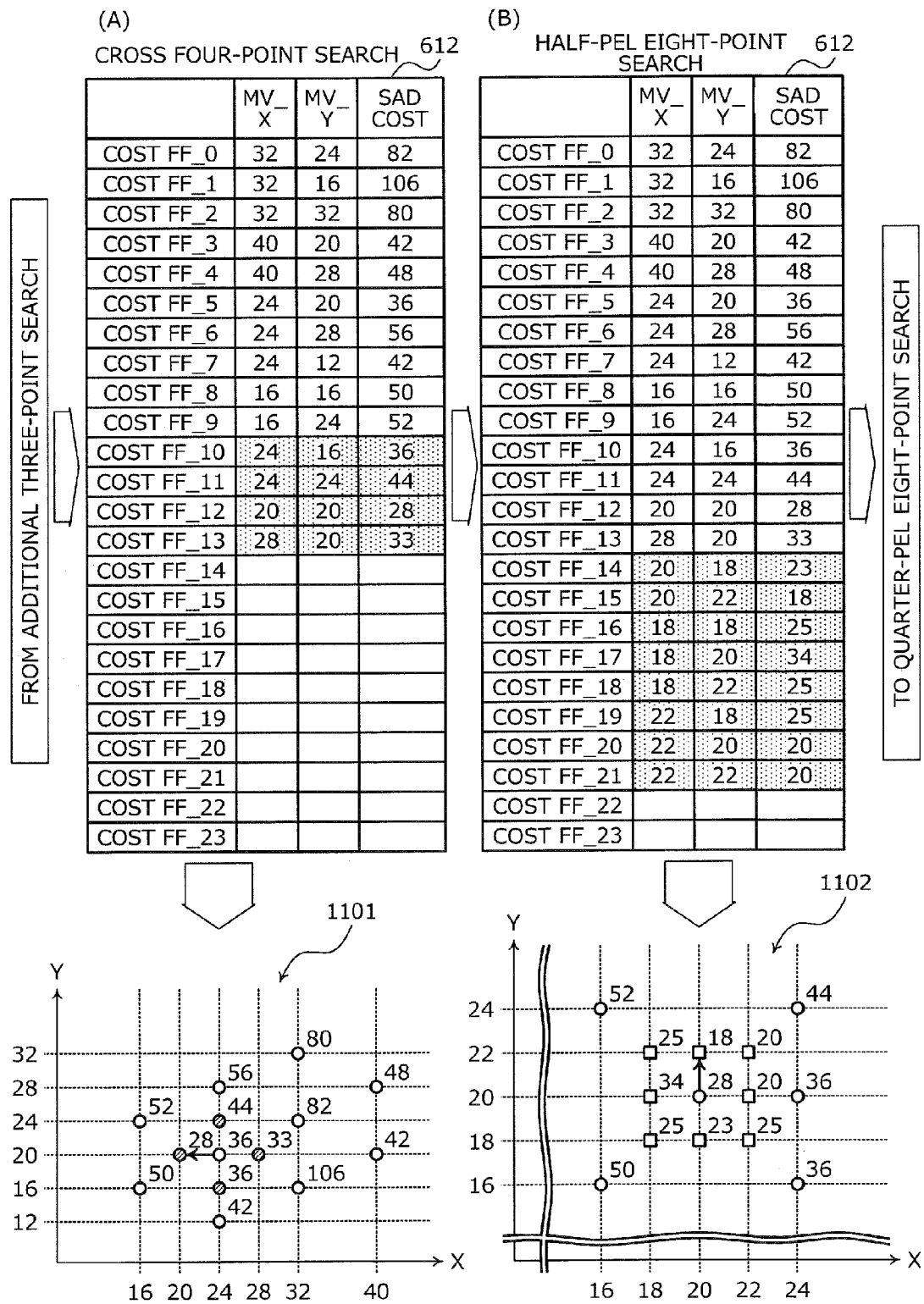
FIG. 11 is an explanatory diagram (Part II) of the example of the motion search process in the non-merge mode.

FIG. 11 is an explanatory diagram (Part II) of the example of the motion search process in the non-merge mode. (A) of FIG. 11 depicts the state where the hexagonal search comes to an end and the cross four-point search is executed. For the cross four-point search, the encoding apparatus 100 newly calculates the SAD costs of four search points at (24, 16), (24, 24), (20, 20), and (28, 20) centered about a central search point at (24, 20). The encoding apparatus 100 stores the X-coordinate and the Y-coordinate of the candidate motion vector and the calculated SAD cost of each of the four search points into the cost FFs FF_10 to FF_13.

The X-Y plane 1101 represents the position relations of the four search points and the SAD costs thereof in addition to the state of the X-Y plane 1002. As represented by the X-Y plane 1101, the search point having the SAD cost of "28", which is the lowest among the central search point and the new four search points, is at (20, 20).

As depicted in (B) of FIG. 11, the encoding apparatus 100 executes a half-pel search centered about the search point at (20, 20) as the central search point. For example, the encoding apparatus 100 calculates the SAD costs of eight search points at (20, 18), (20, 22), (18, 18), (18, 20), (18, 22), (22, 18), (22, 20), and (22, 22), and stores the X-coordinate, the Y-coordinate, and the calculated SAD cost of the candidate motion vector of each of the eight search points into the cost FFs $FF_{13}$ 14 to FF_21.

The X-Y plane 1102 represents the position relations of the eight search points at the half-pel precision and the SAD costs thereof in addition to the state of the X-Y plane 1101. An represented by the X-Y plane 1102, the search point having the SAD cost of "18", which is the lowest among the central search point and the new eight search points, is at (20, 22).

Figure 12:
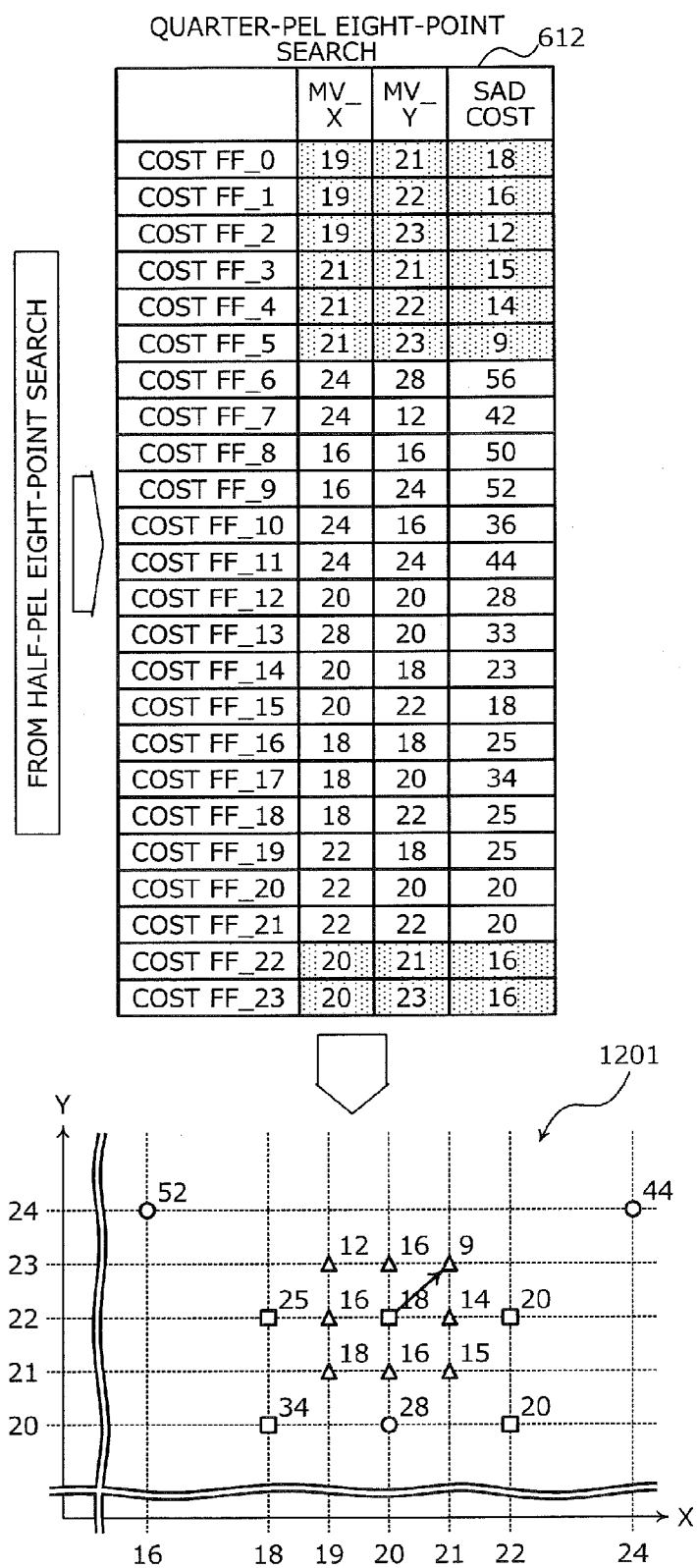
FIG. 12 is an explanatory diagram (Part III) of the example of the motion search process in the non-merge mode.

FIG. 12 is an explanatory diagram (Part III) of the example of the motion search process in the non-merge mode. FIG. 12 depicts the state where the half-pel search comes to an end and the quarter-pel search is executed. The encoding apparatus 100 executes the quarter-pel search using the search point at (20, 22) as the central search point. For example, the encoding apparatus 100 newly calculates the SAD costs of the eight search points at (20, 21), (20, 23), (19, 21), (19, 22), (19, 23), (21, 21), (21, 22), and (21, 23).

The encoding apparatus 100 stores the X-coordinate, the Y-coordinate, and the calculated SAD cost of the candidate motion vector of each of the eight search points into the cost FFs FF_22 to FF_23 and FF_0 to FF_5. In this manner, when the number of records to be written into the cost FF 612 becomes maximal, the encoding apparatus 100 resets to "0", the index indicating the records of the cost FF 612 and overwrites the content of the record of the cost FF 612 that has the oldest cost written therein.

The X-Y plane 1201 represents the position relations of the eight search points at the quarter-pel precision and the SAD costs thereof in addition to the state of the X-Y plane 1102. As represented by the X-Y plane 1201, the search point having the SAD cost of "9", which is the lowest among the central search point and the new eight search points, is at (21, 23). Therefore, the encoding apparatus 100 identifies the search point at (21, 23) as the first candidate motion vector.

The encoding apparatus 100 selects a cost curved surface to be used to calculate the pseudo SAD cost of the cost curved surfaces [0], . . . , and [$CT_{num}$−1]. An example of selection of the cost curved surface will be described with reference to FIG. 13.

FIG. 13 is an explanatory diagram of an example of selection of the cost curved surface. With reference to FIG. 13, an example of the selection of the cost curved surface will be described that uses the first candidate motion vector at (21, 23) identified in FIG. 12, the SAD cost that is "9", and the SAD costs of the candidate vectors, calculated in FIGS. 10 to 12.

For each of the cost curved surfaces [0] to [$CT_{num}$−1], the encoding apparatus 100 calculates the approximated values of the SAD costs stored in the cost FF. Description will be made with reference to FIG. 13 taking an example of the approximated value of the cost curved surface [0].

A table 1301 depicts an example of calculation of the approximated value of the cost curved surface [0]. For the cost FF FF_0, the encoding apparatus 100 calculates an X-offset of "−2" and the Y-offset of "−2" by subtracting the coordinate position (21, 23) of the first candidate motion vector from (MV_X=19, MV_Y=21) of the cost FF FF_0. The encoding apparatus 100 also calculates a cost offset of [9] by subtracting the SAD cost of "9" of the first candidate motion vector from the SAD cost of "18" of the cost FF FF_0.

The encoding apparatus 100 calculates an absolute value of "1" of the difference of the SAD cost of "8" of (X,Y)=(−2, −2) of the cost curved surface [0] table 801_0 from the cost offset of "9". Similarly, for each of the cost. FFs FF_1 to FF_23, the encoding apparatus 100 executes the same process as that executed for the cost FF FF_0, totals the absolute values of the differences, and calculates the approximated value of the cost curved surface [0]. In the example of FIG. 13, the encoding apparatus 100 calculates the approximated value of "378" of the cost curved surface [0]. A case may be present where the SAD cost corresponding to the X-offset and the Y-offset is not stored in the cost curved surface table 613. The example depicted in FIG. 13 is a case where the X-offset is 3 and the Y-offset is −11. In this case, the encoding apparatus 100 sets a predetermined value as the absolute value of the difference such that the approximated value of the cost curved surface is increased. In the example of FIG. 13, the predetermined value is set to be "128".

Similarly, for each of the cost curved surfaces [1] to [$CT_{num}$−1], the encoding apparatus 100 executes the same process as that executed for the cost curved surface [0] and selects the cost curved surface whose approximated value is the lowest.

Figure 14:
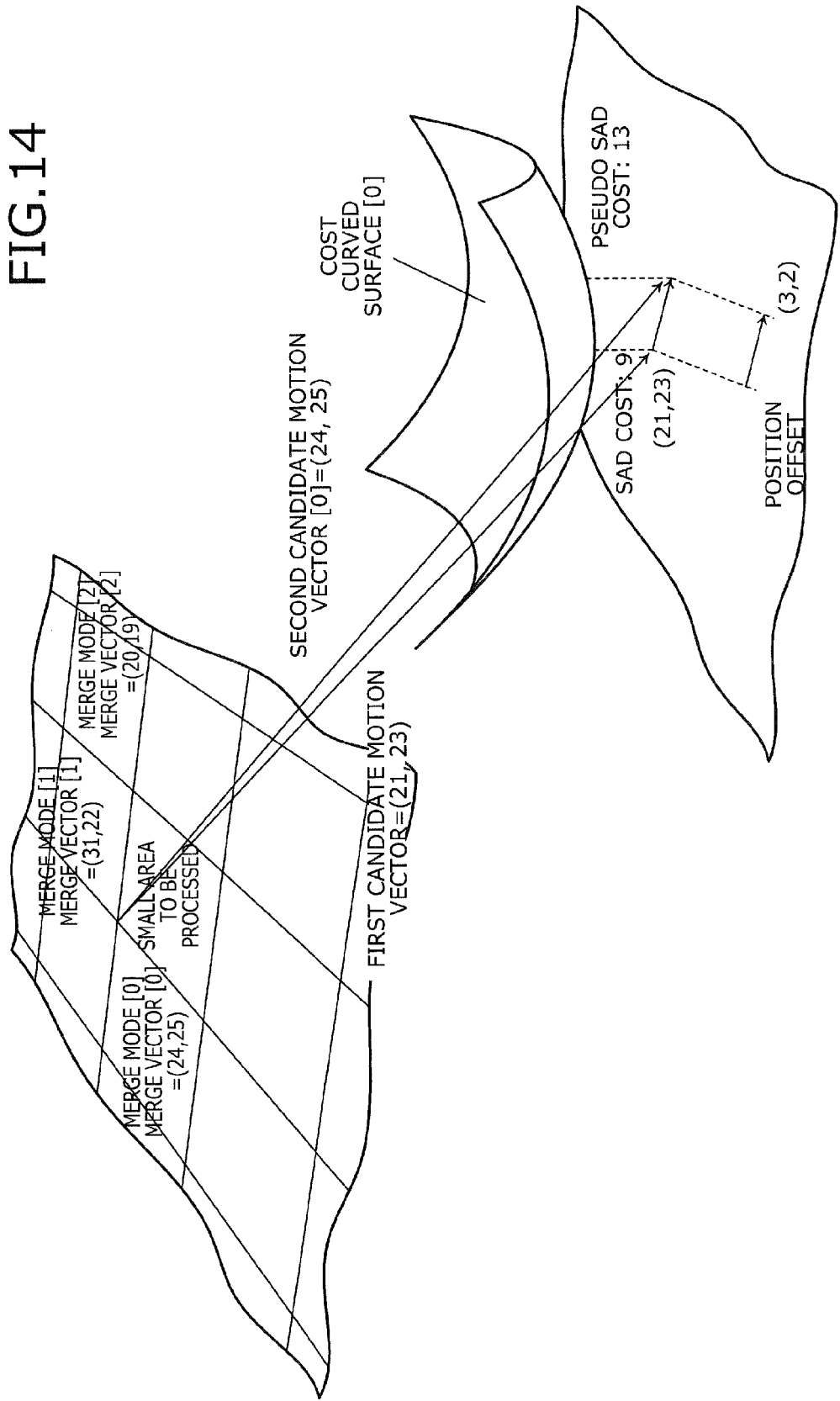
FIG. 14 is an explanatory diagram of an example of calculation of a pseudo SAD cost in the merge mode.

FIG. 14, is an explanatory diagram of an example of calculation of the pseudo SAD cost in the merge mode. FIG. 14 depicts an example of calculation of the pseudo SAD costs of the merge vectors [0] to [4]. FIG. 14 depicts the pseudo SAD cost calculated when the merge vector [0] is the second candidate vector. It is assumed that the cost curved surface [0] used in FIG. 14 is a curved surface expressed by "SAD cost=$X^2+Y^2+9$".

The encoding apparatus 100 determines whether the merge vector [0] is present within the cost curved surface [0]. The first candidate motion vector is (21, 23), the merge vector [0] is (24, 25), and the position offset is (3, 2). Therefore, the merge vector [0] is present within the range of X that is from −8 to 7 and the range of Y that is from −8 to 7 of the cost curved surface [0]. When the merge vector is present within the cost curved surface, the encoding apparatus 100 acquires from the cost curved surface [0] table 801_0, the SAD cost of 13 whose position offset is (3, 2) and determines that the acquired value is the pseudo SAD cost. The encoding apparatus 100 acquires "14" by adding the merge IDX cost that is "1" to the pseudo SAD cost, as the pseudo merge cost.

When the encoding apparatus 100 selects the merge vector [1] as the second candidate motion vector, the encoding apparatus 100 calculates the pseudo merge cost similarly to the merge vector [0]. The encoding apparatus 100 determines whether the merge vector [1] is present within the cost curved surface [0]. The first candidate motion vector is (21, 23), the merge vector [1] is (31, 22), and the position offset is (10, −1). Therefore, the merge vector [1] is not present within the range of X that is from −8 to 7 and the range of Y that is from −8 to 7 of the cost curved surface [0]. Therefore, the encoding apparatus 100 sets the pseudo merge cost to be a Max cost with which the corresponding merge mode is not selected. The "Max cost" is set to be, for example, 65535. The encoding apparatus 100 similarly processes each of the merge vectors [2] to [4] to calculate the pseudo merge costs.

Figure 15:
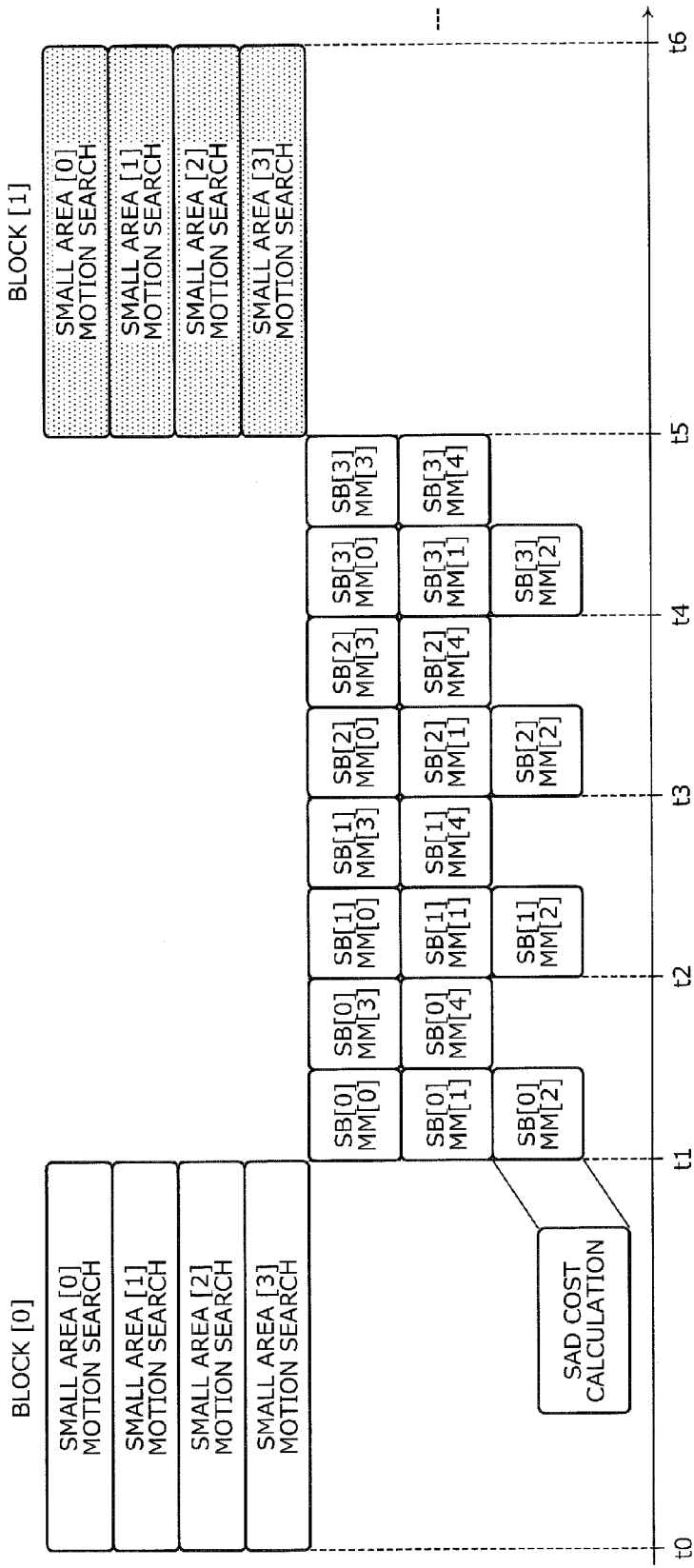
FIG. 15 is an explanatory diagram of an example of the timing at which a motion search and the calculation of the pseudo SAD costs are sequentially executed.
Figure 16:
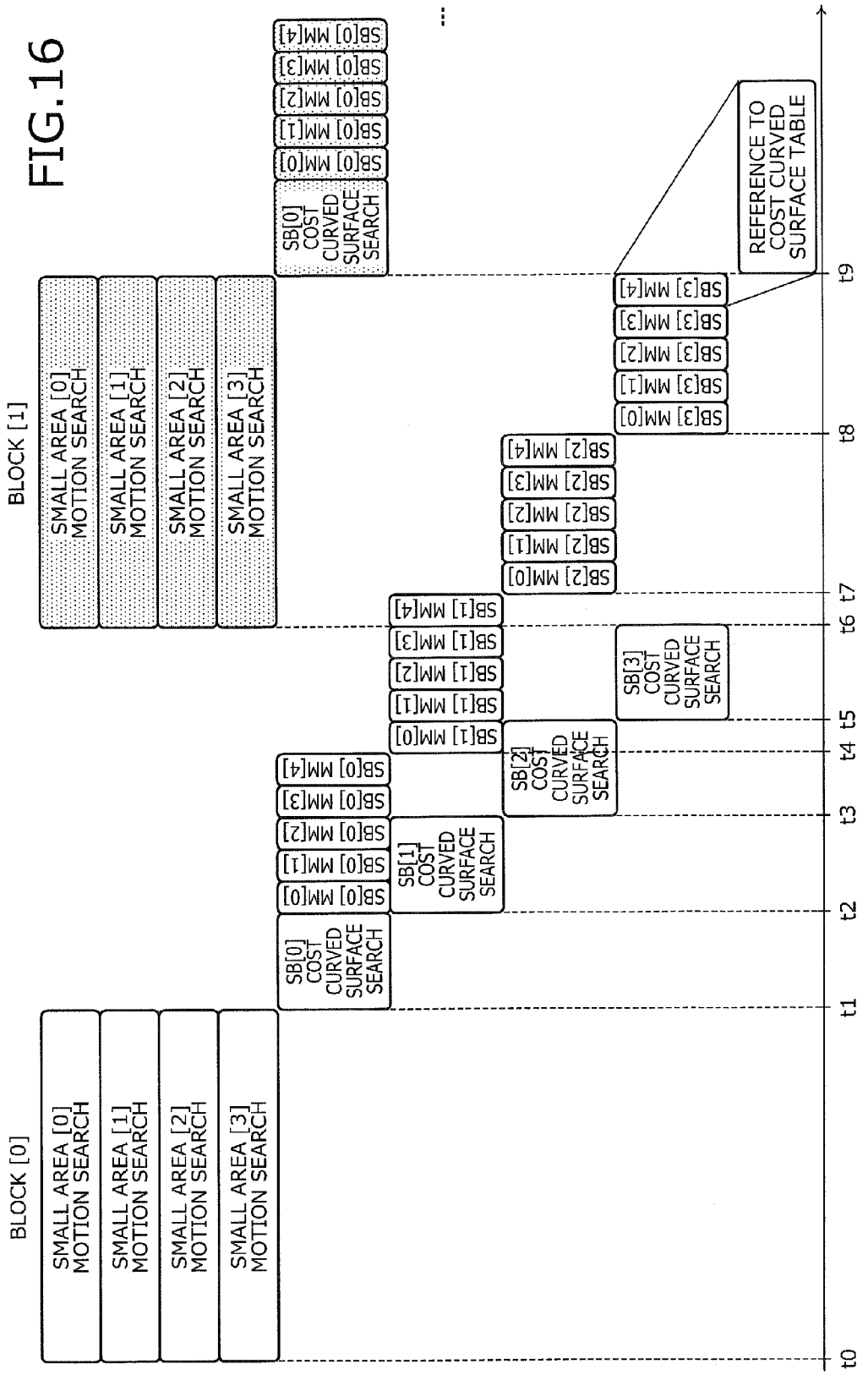
FIG. 16 is an explanatory diagram of a first example of the timing at which the motion search and the calculation of the pseudo SAD costs of the non-merge mode are executed in parallel.
Figure 17:
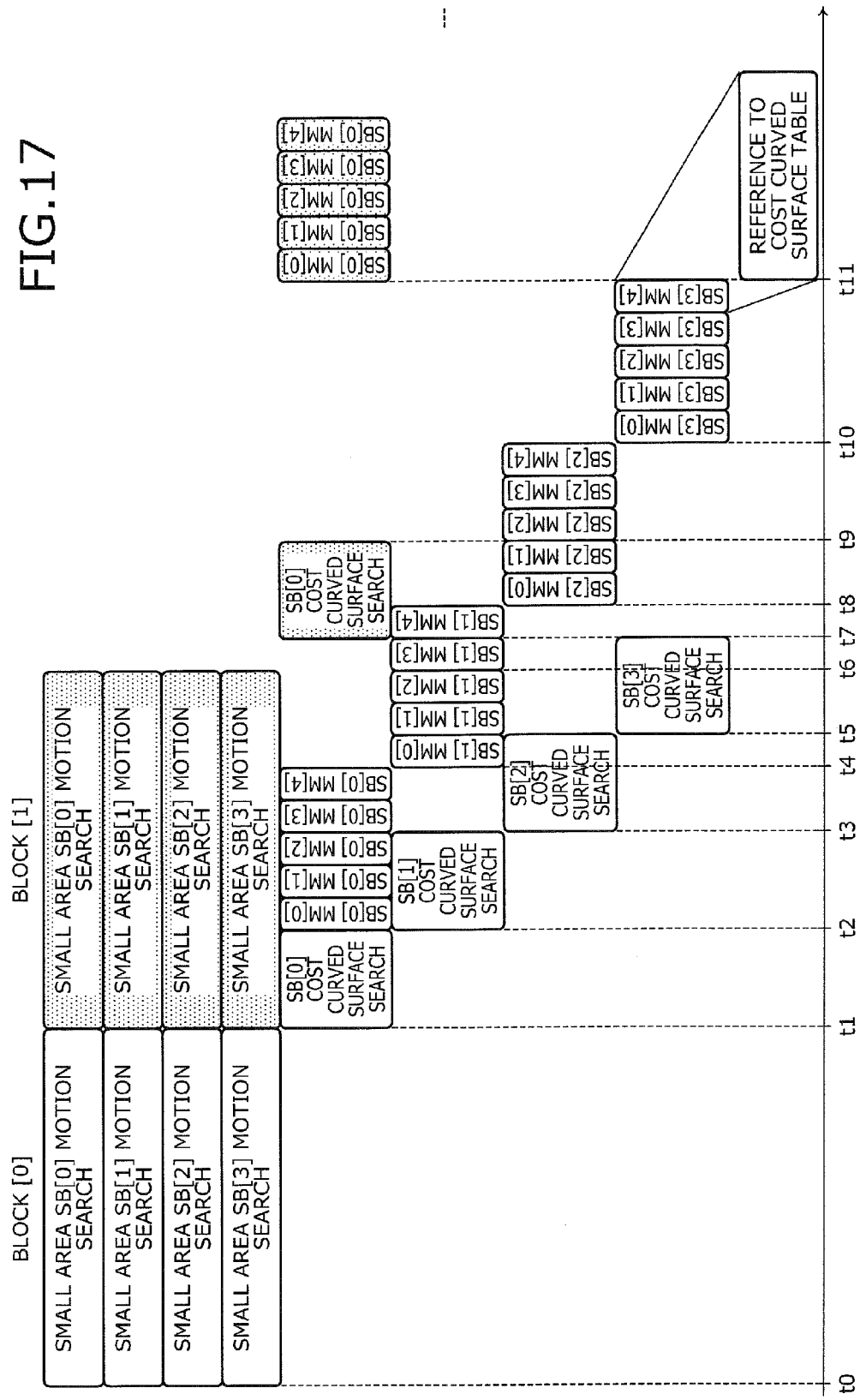
FIG. 17 is an explanatory diagram of a second example of the timing at which the motion search and the pseudo SAD cost calculation of the non-merge mode are executed in parallel.

As described, the encoding apparatus 100 calculates the pseudo merge cost for each of the merge vectors. The timings at which the motion search and the calculation of the pseudo SAD costs are sequentially executed and the timings at which the motion search and the calculation of the pseudo SAD costs are executed in parallel will be described with reference to FIGS. 15 to 17. The timings of the processes concerning the blocks [0] and [1] will be described with reference to FIGS. 15 to 17 representing one process by a round-corner square. In FIGS. 15 to 17, round-corner squares without hatching represent the processes concerning the block [0]. On the other hand, hatched round-corner squares represent processes concerning the block [1]. In FIGS. 15 to 17, the small area may be labeled as "SB" and the merge mode may be labeled as "MM".

FIG. 15 is an explanatory diagram of an example of the timing at which the motion search and the calculation of the pseudo SAD costs are sequentially executed. In FIG. 15, an encoding apparatus sequentially executing the motion search and the calculation of the pseudo SAD costs also executes the motion search and the calculation of the pseudo SAD costs for each of the blocks [0] and [1]. In FIG. 15, the encoding apparatus sequentially executing the motion search and the calculation of the pseudo SAD costs is referred to as "sequentially encoding apparatus" and it is assumed that the sequentially encoding apparatus includes four reference image memories and four SAD calculation circuits.

The sequentially encoding apparatus executes, from a time to t0 a time t1, a small area [0] motion search process to a small area [3] motion search process for the block [0] and executes, from time t1 to a time t2, SAD cost calculation processes for the merge modes [0] to [4] of the small area [0].

In the merge mode, the motion vectors of the adjacent small areas are used and therefore, after determining the motion vector of a small area, the sequentially encoding apparatus determines the motion vector of the next small area. Therefore, the sequentially encoding apparatus determines at time t2, the motion vector of the small area [0]; thereafter, from time t2 to time t3, executes the SAD cost calculation processes for the merge modes [0] to [4] of the small area [1]; from time t3 to time t4, executes the SAD cost calculation processes for the merge modes [0] to [4] of the small area [2]; and, from time t4 to time t5, executes the SAD cost calculation processes for the merge modes [0] to [4] of the small area [3].

The sequentially encoding apparatus executes, from time t5 to time t6, the small area [0] motion search process to the small area [3] motion search process for the block [1]. When the sequentially encoding apparatus tries executing the small area [0] motion search process to the small area [3] motion search process for the block [1] from time t2, the sequentially encoding apparatus has to prepare seven reference image memories and seven SAD calculation circuits and therefore, the scale of the circuit is increased.

The timings at which the motion search and the calculation of the pseudo SAD costs are executed in parallel will be described with reference to FIGS. 16 and 17. In FIGS. 16 and 17, it is assumed that the encoding apparatus 100 includes four reference image memories, four SAD calculation circuits, one circuit to search for the cost curved surface, and one circuit to calculate the pseudo SAD cost. In FIG. 16, it is assumed that the encoding apparatus 100 includes one surface of cost FF 612, using the cost FFs FF_0 to FF_23 as one surface. On the other hand, in FIG. 17, it is assumed that the encoding apparatus 100 includes two surfaces of cost FF 612.

FIG. 16 is an explanatory diagram of a first example of the timing at which the motion search and the calculation of the pseudo SAD costs of the non-merge mode are executed in parallel. From time to t0 time t1, the encoding apparatus 100 executes the small area [0] motion search process to the small area [3] motion search process for the block [0] and, from time t1 to time t2, executes the cost curved surface search process for the small area [0].

From time t2 to time t3, the encoding apparatus 100 executes the cost curved surface search process for the small area [1]. For the cost curved surface search process, the cost FF 612 and the cost curved surface, table 613 are referred to while the reference image memory is not referred to, and the SAD calculation circuit is also not used. From time t3 to time t5, the encoding apparatus 100 executes the cost curved surface search process for the small area [2]. From time t5 to time t6, the encoding apparatus 100 executes the cost curved surface search process for the small area [3].

From time t2 to time t4, the encoding apparatus 100 executes pseudo SAD cost calculation processes for the merge modes [0] to [4] of the small area [0]. For the pseudo SAD cost calculation process, the cost curved surface table 613 is referred to while the reference image memory is not referred to and the SAD calculation circuit is also not used.

As also described with reference to FIG. 15, the motion vectors of the adjacent small areas are used for the merge mode and therefore, after determining the motion vector of a small area, the encoding apparatus 100 determines the motion vector of the next small area. Therefore, the encoding apparatus 100 determines the motion vector of the small area [0] at time t4; thereafter, from time t4 to time t7, executes the pseudo SAD cost calculation processes for the merge modes [0] to [4] of the small area [1] from time t7 to time t8, executes the pseudo SAD cost calculation processes for the merge modes [0] to [4] of the small area [2]; and from time t8 to time t9, executes the pseudo SAD cost calculation processes for the merge modes [0] to [4] of the small area [3].

The cost FF 612 is referred to in the cost curved surface search process but is not referred to in the pseudo SAD cost calculation process. Therefore, after the cost curved surface search process for the small area [3] comes to an end at time t6, the encoding apparatus 100 from time t6 to time t9 executes the small area [0] motion search process to the small area [3] motion search process for the block [1].

In FIG. 16, from time t6 to time t9, the encoding apparatus 100 executes, in parallel, the motion search processes and the pseudo SAD cost calculation processes. Therefore, the encoding apparatus 100 can execute the cost evaluation of the merge mode at a high speed without increasing the reference image memory and the SAD calculation circuit and therefore, simplification is facilitated for the realization of the real time encoding.

FIG. 17 is an explanatory diagram of a second example of the timing at which the motion search and the pseudo SAD cost calculation of the non-merge mode are executed in parallel. From time t10 to time t11, the encoding apparatus 100 executes the small area [0] motion search process to the small area [3] motion search process for the block [0] and from time t1 to time t2, executes the cost curved surface search process for the small area [0].

The encoding apparatus 100 executes, from time t2 to time t3, the cost curved surface search process for the small area [1]; executes, from time t3 to time t5, the cost curved surface search process for the small area [2]; and executes, from time t5 to time t7, the cost curved surface search process for the small area [3].

The encoding apparatus 100 executes, from time t2 to time t4, the pseudo SAD cost calculation processes for the merge modes [0] to [4] of the small area [0]; executes, from time t4 to time t8, the pseudo SAD cost calculation processes for the merge modes [0] to [4] of the small area [1]; executes, from time t8 to time t10, the pseudo SAD cost calculation processes for the merge modes [0] to [4] of the small area [2]; and executes, from time t10 to time t11, the pseudo SAD cost calculation processes for the merge modes [0] to [4] of the small area [3].

In FIG. 17, the encoding apparatus 100 includes the two surfaces of post FF 612 and therefore, executes, from time t1 to time t6, the small area [0] motion search process to the small area [3] motion search process for the block [1]. After the cost curved surface search process for the small area [3] of the block [0] comes to an end at time t7, the encoding apparatus 100 executes, from time t7 to time t9, the cost curved surface search process for the small area [0] of the block [1].

In FIG. 17, the encoding apparatus 100 executes in parallel, from time t1 to time t6, the motion search process, the cost curved surface search process, and the pseudo SAD cost calculation process. Therefore, the encoding apparatus 100 can execute the cost evaluation of the merge mode at a high speed without increasing the reference image memory and the SAD calculation circuit and therefore, facilitates simplification of the realization of the real time encoding. Compared to the encoding apparatus 100 depicted in FIG. 16, for the encoding apparatus 100 depicted in FIG. 17, the processes that can be executed in parallel are increased to three processes including the motion search process, the cost curved surface search process, and the pseudo SAD cost calculation process and therefore, the cost evaluation can be executed at a higher speed.

A flowchart that is executed by the encoding apparatus 100 will be described with reference to FIGS. 18 to 27. In FIGS. 20 and 25, a portion surrounded by horizontal double lines represents parallel execution of the processes.

Figure 18:
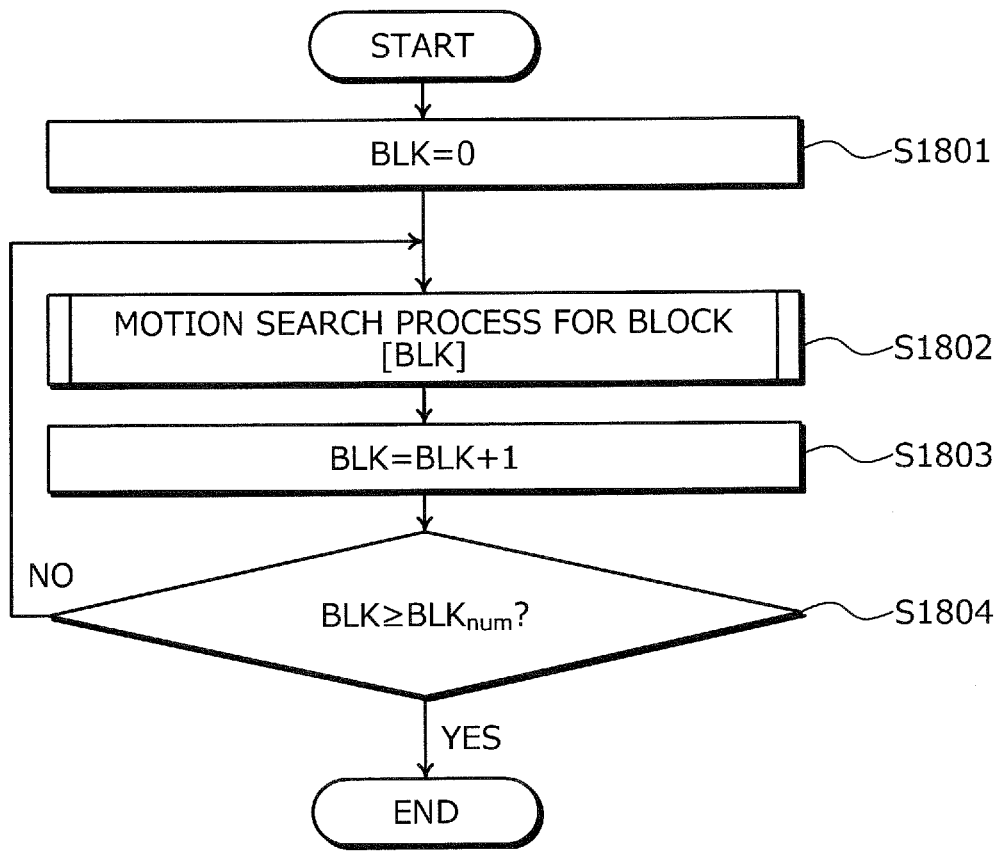
FIG. 18 is a flowchart of an example of a procedure of the motion search process for one picture.

FIG. 18 is a flowchart of an example of a procedure of the motion search process for one picture. The motion search process for the one picture is a process of determining the motion vector of each block included in the picture.

The encoding apparatus 100 sets a variable BLK to be zero (step S1801) and executes the motion search process for the block [BLK] (step S1802). The motion search process for a block will be described later with reference to FIG. 19. The encoding apparatus 100 increments the variable OLIN (step S1803) and determines if the variable BLK is greater than or equal to $BLK_{num}$ (step S1904). If the encoding apparatus 100 determines that the variable BLK is smaller than $BLK_{num}$ (step S1804: NO), the encoding apparatus 100 progresses to the operation at step S1802.

If the encoding apparatus 100 determines that the variable BLK is greater than or equal to $BLK_{num}$ (step S1804: YES), the encoding apparatus 100 causes the motion search process for the one picture to come to an end. The execution of the motion search process for the one picture enables the encoding apparatus 100 to determine the motion vector of each block included in the picture.

For the operations at step S1802, the encoding apparatus 100 may execute the operations in parallel when the processes are executable in parallel, based on the number of surfaces of the cost FF 612, the use state of the cost FF 612, and the use states of the reference image memory and the plural SAD calculation circuits.

For example, it is assumed that one surface of cost FE 612 is present. In this case, when an approximated value calculation process for the cost curved surface depicted in FIG. 25 comes to an end for each of all the cost curved surfaces in all the small areas in the motion search process for a block, the encoding apparatus 100 may start the motion search process for the next block of the block. It is assumed that two surfaces of cost FF 612, four reference image memories, and four SAD calculation circuits are present. In this case, when the motion search processes for the small areas depicted in FIG. 20 in the motion search process for a block come to an end and some of the four reference image memories and some of the four SAD calculation circuits are unused, the encoding apparatus 100 may start the motion search process for the next block.

Figure 19:
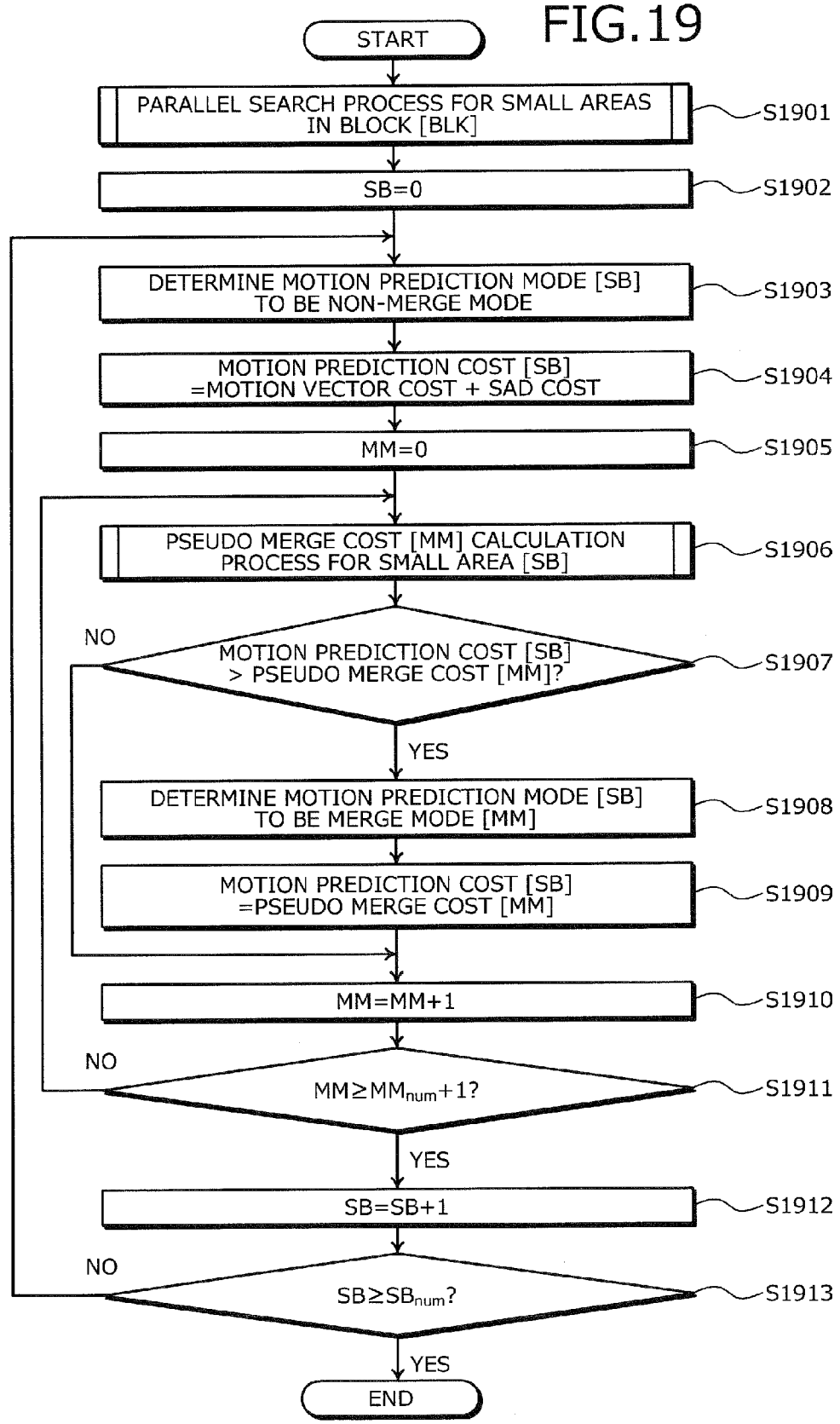
FIG. 19 is a flowchart of an example of the procedure of the motion search process for a block.
Figure 20:
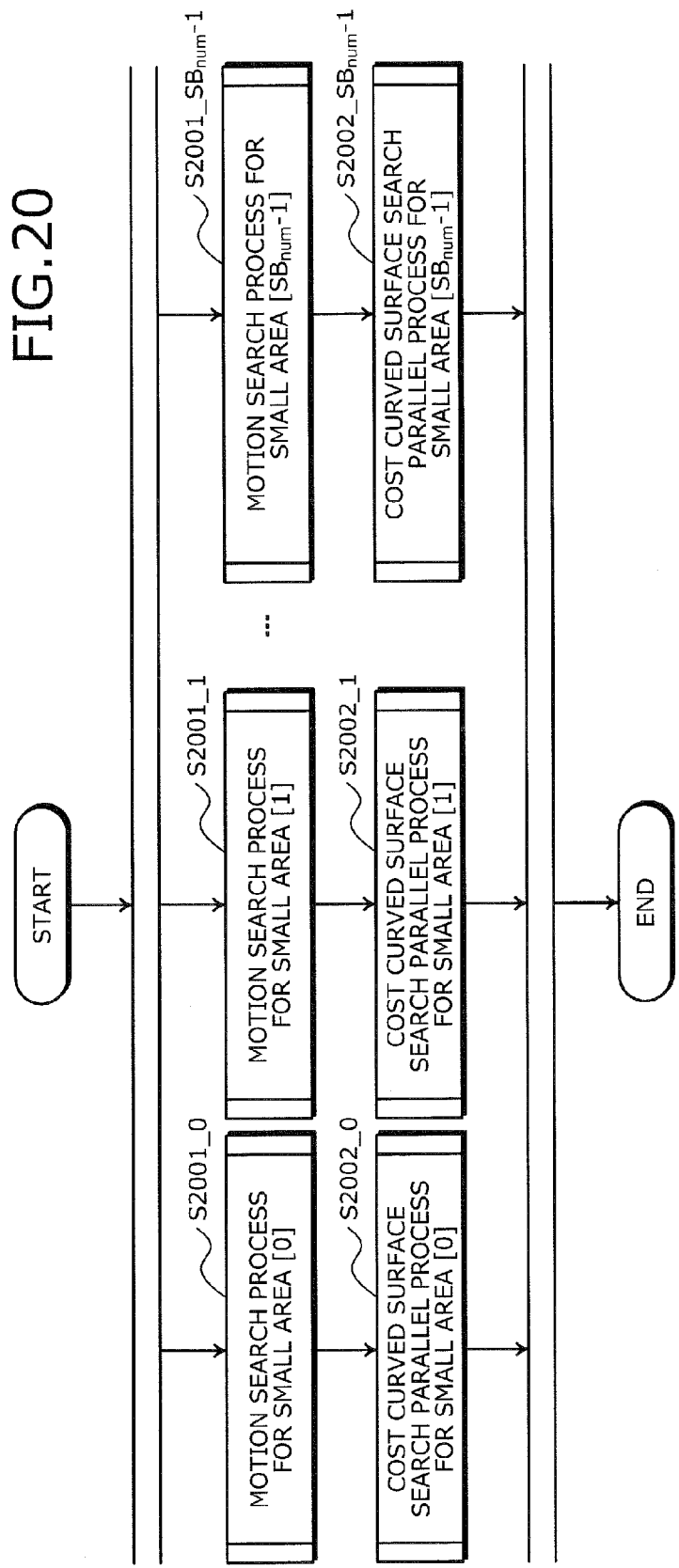
FIG. 20 is a flowchart of an example of a procedure of the parallel search process for plural small areas.

FIG. 19 is a flowchart, of an example of the procedure of the motion search process for a block. The motion search process for a block is a process of searching for the motion vector of the block. The encoding apparatus 100 executes a parallel search process for plural small areas in the block [BLK] (step S1901). The details of the parallel search process for plural small areas will be described with reference to FIG. 20. The encoding apparatus 100 sets a variable SB used as an index of a small area to be zero (step S1902), determines that the motion prediction mode [SB] is the non-merge mode (step S1903), and calculates the motion prediction cost [SB]

according to "the motion prediction cost [SB]=the motion vector cost→the SAD cost" (step S1904).

At step S1904, the motion vector cost is the encoding amount of the first candidate motion vector acquired in the motion search process for the small area [SB] invoked in the parallel search process for the plural small areas depicted in FIG. 20. The SAD cost is the SAD cost of the first candidate motion vector acquired in the motion search process for the small area [SB].

The encoding apparatus 100 sets a variable MM used as an index in the merge mode to be zero (step S1905) and executes a pseudo merge cost [MM] calculation process for the small area [SB] (step S1906). The details of the pseudo merge cost calculation process will be described later with reference to FIG. 27. The encoding apparatus 100 determines whether the motion prediction cost [SB] is greater than the pseudo merge cost [MM] (step S1907). If the encoding apparatus 100 determines that the motion prediction cost [SB] is greater than the pseudo merge cost [MM] (step S1907: YES), the encoding apparatus 100 determines that the motion prediction mode [SB] is the merge mode [MM] (step S1908) and substitutes the motion prediction cost [SB] with the value of the pseudo merge cost [MM] (step S1909).

After the operation at step S1909 comes to an end, or when the encoding apparatus 100 determines that the motion prediction cost [SB] is less than or equal to the pseudo merge cost [MM] (step S1907: NO), the encoding apparatus 100 increments the variable MM (step S1910). The encoding apparatus 100 determines if the variable MM is greater than or equal to "$MM_{num}+1$" (step S1911). If the encoding apparatus 100 determines that the variable MM is smaller than "$MM_{num}-1$" (step S1911: NO), the encoding apparatus 100 progresses to the operation at step S1906. If the encoding apparatus 100 determines that the variable MM is greater than or equal to "$MM_{num}-1$" (step S1911: YES), the encoding apparatus 100 increments the variable SB (step S1912).

The encoding apparatus 100 determines whether the variable SB is greater than or equal to $SB_{num}$ (step S1913). If the encoding apparatus 100 determines that the variable SB is smaller than $SB_{num}$ (stop S1912; NO), the encoding apparatus 100 progresses to the operation at step S1903. If the encoding apparatus 100 determines that the variable SB is greater than or equal to $SB_{num}$ (step S1913: YES), the encoding apparatus 100 causes the motion search process for the block to come to an end. After causing the motion search process for the block to come to an end, the encoding apparatus 100 executes quantization and entropy encoding. The execution of the motion search process for the block enables the encoding apparatus 100 to select the optimal motion vector of the block.

FIG. 20 is a flowchart of an example of a procedure of the parallel search process for plural small areas. The plural small area parallel search process is a process of executing for each of the plural small areas, the motion search and the cost curved surface search in parallel. The encoding apparatus 100 executes the motion search process for the small area [0] (step S2001_0). The details of the motion search process for the small area will be described later with reference to FIGS. 21 and 22. The encoding apparatus 100 executes the coot curved surface search parallel process for the small area [0] (step S2002_0). The cost curved surface search parallel process for the small area will be described later with reference to FIG. 25.

The encoding process 100 executes the motion search process for the small area [1] in parallel with the series of operations at steps S2001_0 and S2002_0 (step S2001_1) and executes the cost curved surface search parallel process for the small area [1] (step S2002_1). In this manner, the encoding apparatus 100 executes the cost curved surface search parallel process for each of the small areas, executes the motion search process for the small area [$SB_{num}-1$] (step S2001_$SB_{num}-1$), and executes the cost curved surface search parallel process for the small area [$SB_{num}-1$] (step S2002_$SB_{num}-1$).

After the operations at steps S2002_0, S2002_1, . . . , and S2002_$SB_{num}-1$ come to an end, the encoding apparatus 100 causes the plural small area parallel search process to come to an end. The execution of the plural small area parallel search process enables the encoding apparatus 100 to search for the motion vectors and the optimal cost curved surface in parallel, for the plural small areas.

Figure 21:
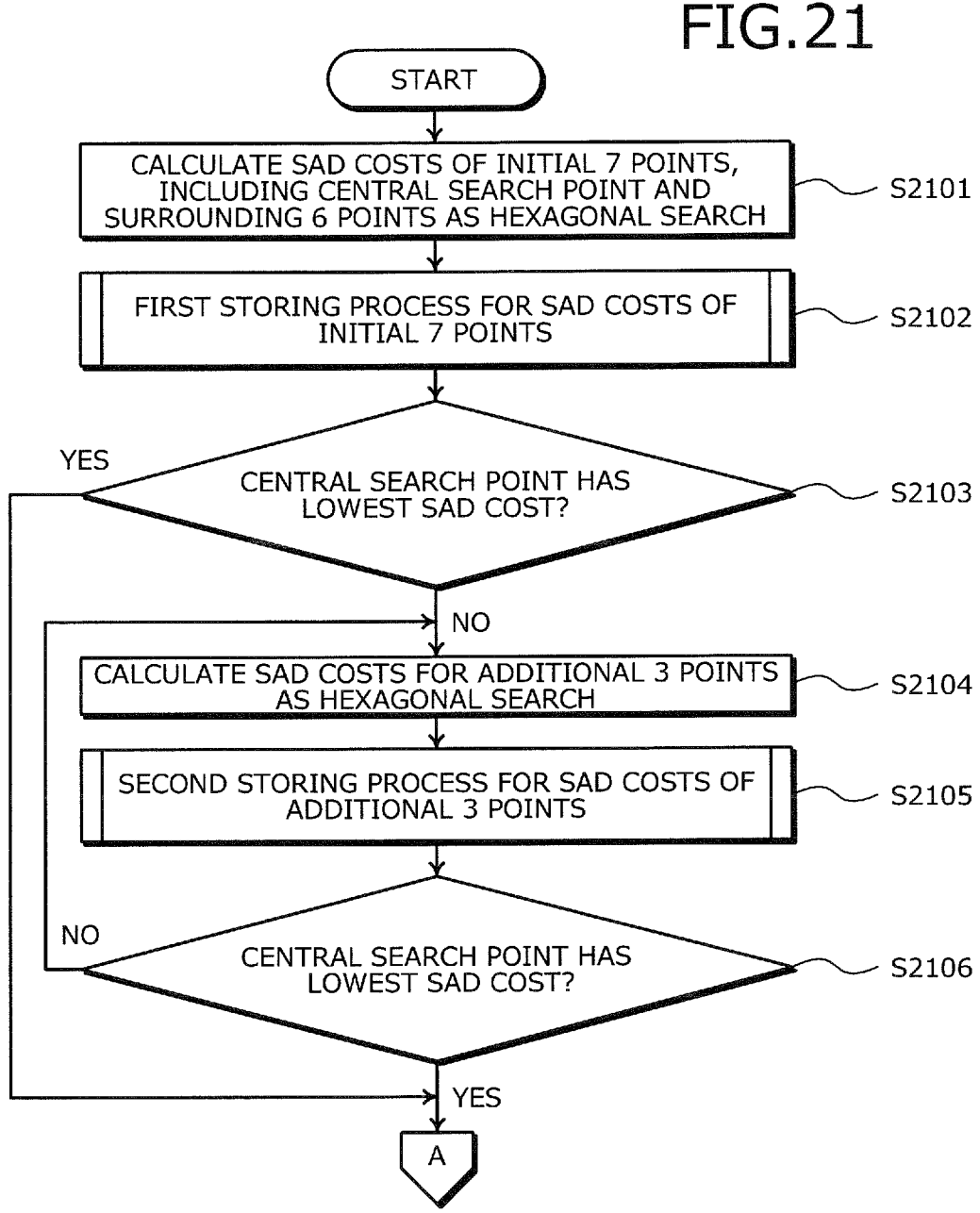
FIG. 21 is a flowchart (Part I) of an example of a procedure of the motion search process for a small area.

FIG. 21 is a flowchart (Part I) of an example of a procedure of the motion search process for a small area. The motion search process for a small area is a process of searching for the first candidate motion vector of the small area to be processed. The encoding apparatus 100 calculates the SAD costs of the initial seven points for the central search point and the surrounding six points as the hexagonal search (step S2101) and executes a first storing process for the calculated SAD costs of the initial seven points (step S2102). The details of the first storing process for the SAD costs will be described later with reference to FIG. 23.

The encoding apparatus 100 determines whether the SAD cost of the central search point is the lowest SAD cost (step S2103). If the encoding apparatus 100 determines that the SAD cost of the central search point is not the lowest SAD cost (step S2103: NO), the encoding apparatus 100 calculates SAD costs for additional three points as the hexagonal search (step S2104) and executes a second storing process for the calculated. SAD costs of the additional three points (step S2105). The details of the second storing process for the SAD costs will be described later with reference to FIG. 24.

The encoding apparatus 100 determines whether the SAD cost of the central search point is the lowest SAD cost (step S2106). If the encoding apparatus 100 determines that the SAD cost of the central search point is not the lowest SAD cost (step S2106: NO), the encoding apparatus 100 progresses to the operation at step S2104.

If the encoding apparatus 100 determines that the SAD cost of the central search point is the lowest SAD cost (step S2103: YES and step S2106: YES), the encoding apparatus 100 progresses to the operation at step S2201 depicted in FIG. 22.

Figure 22:
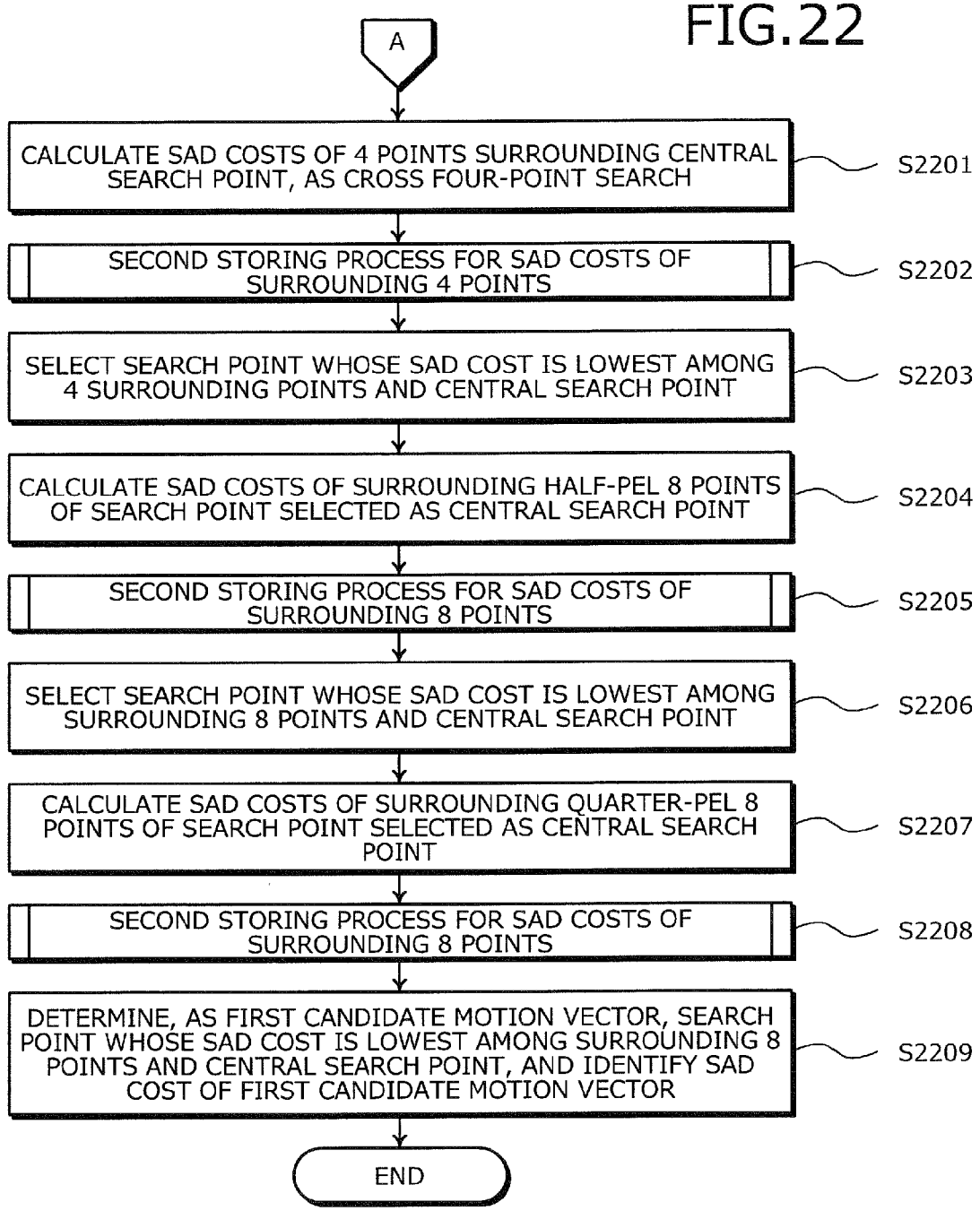
FIG. 22 is a flowchart (Part II) of the example of the procedure of the motion search process for a small area.

FIG. 22 is a flowchart (Part II) of the example of the procedure of the motion search process for a small area. When the process step reaches "step S2103: YES" or "step S2106: YES", the encoding apparatus 100 calculates the SAD costs of the four points surrounding the central search point as the cross four-point search (step S2201), executes the second storing process for the calculated SAD costs of the surrounding four points (step S2202), and selects the search point whose SAD cost is the lowest among the four surrounding points and the central search point (step S2203).

The encoding apparatus 100 calculates SAD costs of the surrounding half-pel eight points centered about a selected search point as the central search point (step S2204), executes the second storing process for the calculated SAD costs of the surrounding eight points (step S2205), selects the search point whose SAD cost is the lowest among the surrounding eight points and the central search point (step S2206), calculates the SAD costs of the surrounding quarter-pel eight points centered about a selected search point as the central search point (step S2207), and executes the second storing process for the calculated SAD costs of the surrounding eight points (step S2208).

The encoding apparatus 100 determines, as the first candidate motion vector, the search point whose SAD cost is the lowest among the surrounding eight points and the central search point, and identifies the SAD cost of the first candidate motion vector (step S2209). After the operation at step S2209 comes to an end, the encoding apparatus 100 causes the motion search process for the small area to come to an end. The execution of the motion search process for the smell area enables the encoding apparatus 100 to identify the first candidate motion vector of the small area.

Figure 23:
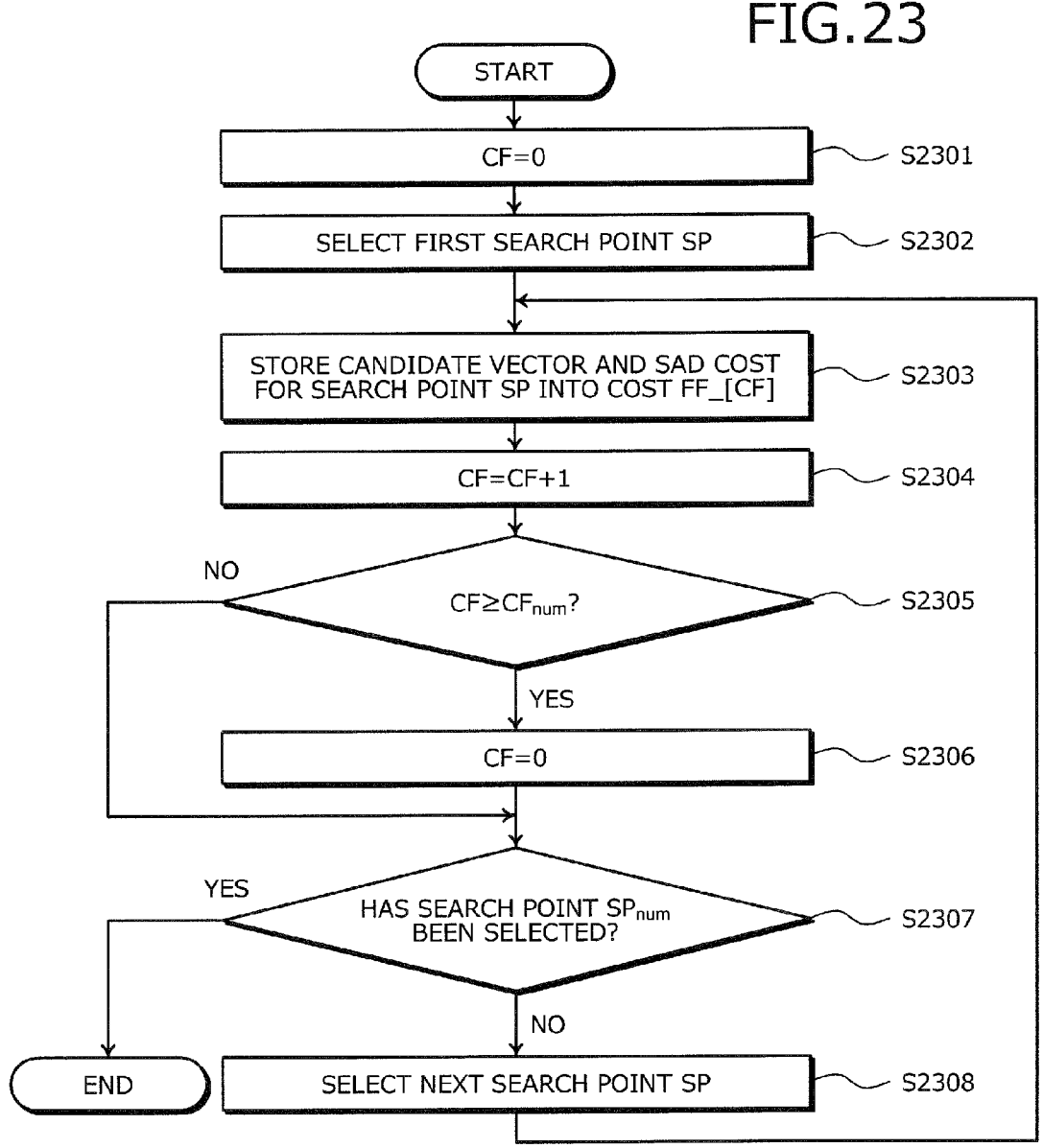
FIG. 23 is a flowchart of an example of a procedure of a first storing process for the SAD costs.

FIG. 23 is a flowchart of an example of a procedure of the first storing process for the SAD costs. The first storing process for the SAD costs is a process of storing the SAD costs into the cost FF 612. It is assumed that the search points to be stored in the cost FF 612 are present from "1" to "$SP_{num}$". When the first storing process for the SAD costs is invoked from the operation at step S2102, $CP_{num}$ is $CP_{num}=7$.

The encoding apparatus 100 sets a variable CF that is used as an index for the cost FF 612 to be zero (step S2301), selects a first search point SP (step S2302), and stores the candidate vector and the SAD cost for the search point SP into the cost FF FF_[CF] (step S2303).

The encoding apparatus 100 increments the variable CF (step S2304) and determines if the variable CF is greater than or equal to the $CF_{num}$ (step 62305). If the encoding apparatus 100 determines that the variable CF is greater than or equal to the $CF_{num}$ (step S2305:YES), the encoding apparatus 100 sets the variable CF to be zero (step S2306).

After the operation at step S2306 comes to an end or if the encoding apparatus 100 determines that the variable CF is smaller than the $CF_{num}$ (step S2305: NO), the encoding apparatus 100 determines whether the encoding apparatus 100 has selected the search point $SP_{num}$ (step S2307). If the encoding apparatus 100 determines that the encoding apparatus 100 has not selected the search point $SP_{num}$ (step S2307: NO), the encoding apparatus 100 selects the next search point SP (step S2308) and progresses to the operation at step S2303.

If the encoding apparatus 100 determines that the encoding apparatus 100 has selected the search point $SP_{num}$ (step S2307: YES), the encoding apparatus 100 causes the first storing process for the SAD costs to come to an end. The execution of the first storing process for the SAD costs enables the encoding apparatus 100 to store the SAD costs into the cost FF 612, and overwriting the information retained in the cost FF 612 enables reduction of the circuits of the cost FF 612.

Figure 24:
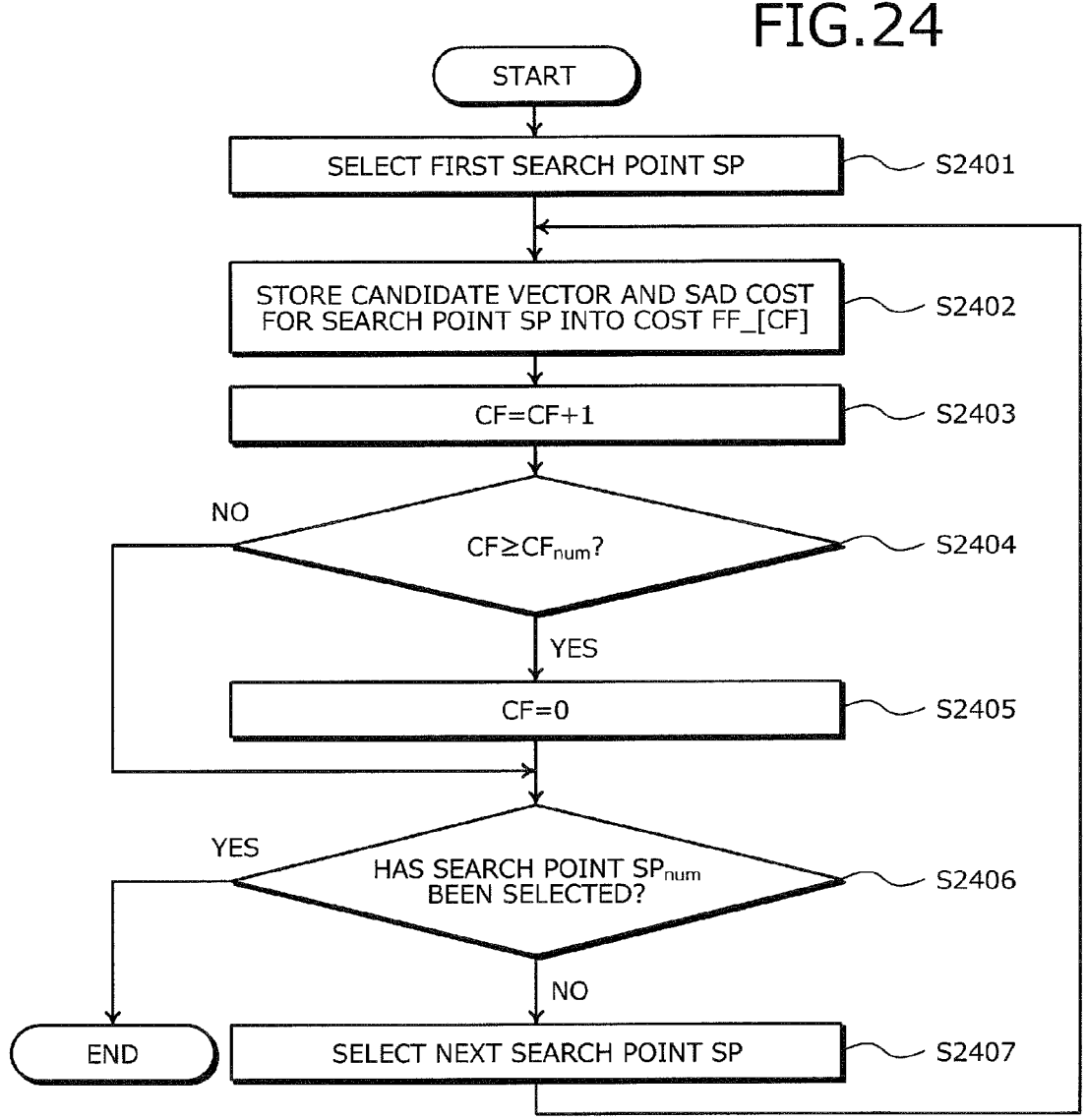
FIG. 24 is a flowchart of an example of a procedure of a second storing process for the SAD costs.
Figure 25:
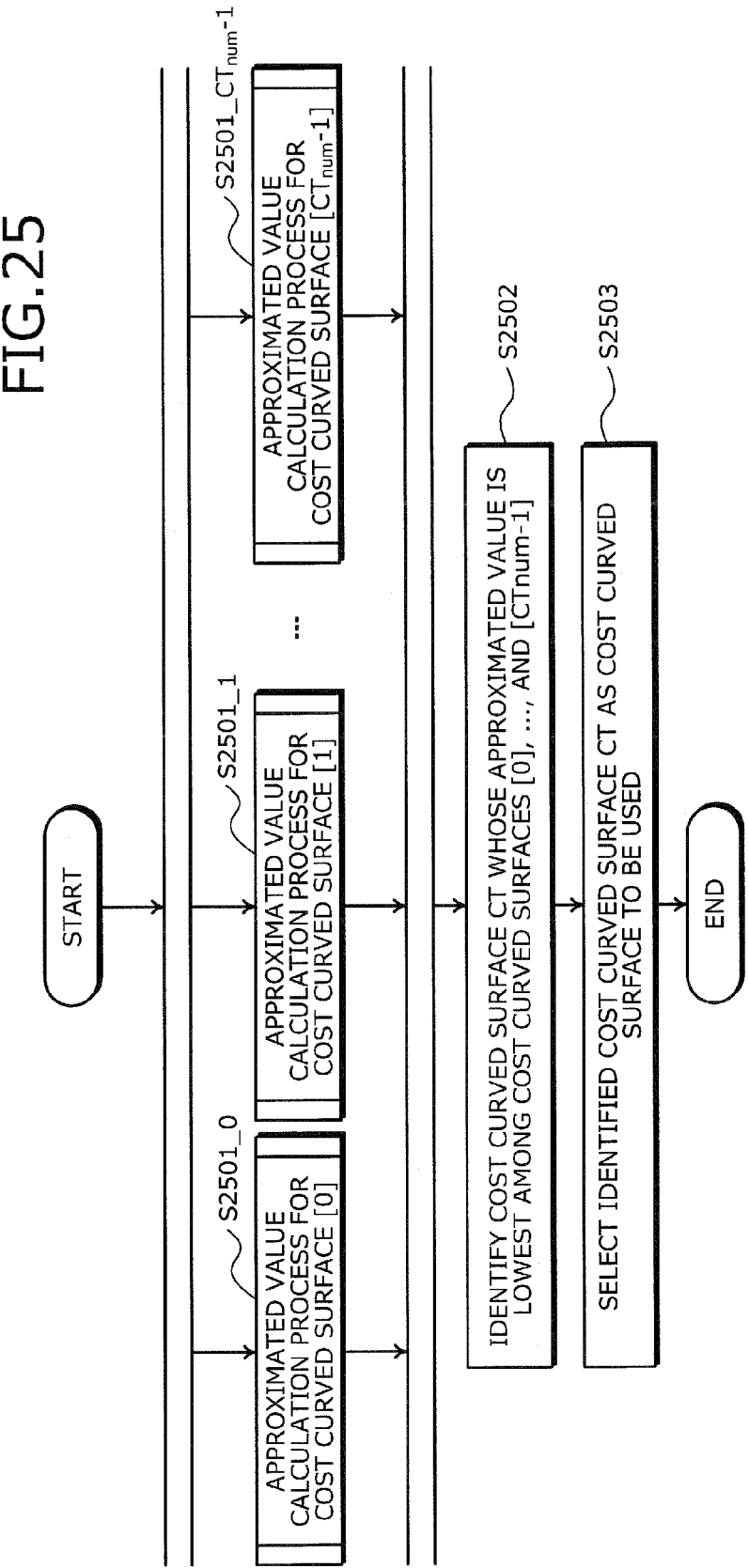
FIG. 25 is a flowchart of an example of a procedure of a cost curved surface search parallel process for a small area.

FIG. 24, is a flowchart of an example of a procedure of the second storing process for the SAD costs. The second process for the SAD costs is the process of storing the SAD costs into the cost FF 612. It is assumed that the search points to be stored in the cost. FF 612 are present from "1" to "$SP_{num}$". For example, when the second storing process for the SAD costs is invoked from the operation at step S2105, $CP_{num}$ is $CP_{num}=3$.

Operations at steps S2401 to S2407 of the flowchart depicted in FIG. 24 are same as those at steps S2302 to S2308 depicted in FIG. 23 and therefore, will not be described again. The execution of the second storing process for the SAD costs enables the encoding apparatus 100 to store the SAD costs into the cost FF 612, and overwriting the information retained in the cost FF 612 enables reduction of the circuits of the cost FF 612.

FIG. 25 is a flowchart of an example of a procedure of the cost curved surface search parallel process for a small area. The cost curved surface search parallel process is a process of searching for the cost curved surface that is optimal for the small area to be processed. The encoding apparatus 100 executes the approximated value calculation process for the cost curved surface [0] (step S2501_0). The details of the approximated value calculation process for the cost curved surface will be described with reference to FIG. 26.

The encoding apparatus 100 executes the approximated value calculation process for the cost curved surface [1] in parallel with the operation at step S2501_0 (step S2501_1). In this manner, the encoding apparatus 100 executes the approximated value calculation process for each of the cost curved surfaces and executes the approximated value calculation process for the cost curved surface $[CT_{num}-1]$ (step S2501_$CT_{num}$-1).

After the operations at steps S2501_0, S2501_1, ..., and S2501_$CT_{num}$-1 come to en end, the encoding apparatus 100 identifies the cost curved surface CT whose approximated value is the lowest among the cost curved surfaces [0], ..., and $[CT_{num}-1]$ (step S2502) and selects the identified cost curved surface CT as the cost curved surface to be used (step S2503). After the operation at step S2503 comes to an end, the encoding apparatus 100 causes the cost curved surface search parallel process for the small area to come to an end. The execution of the cost curved surface search parallel process for a small area enables the encoding apparatus 100 to select the cost curved surface that is optimal for the small area to be processed.

Figure 26:
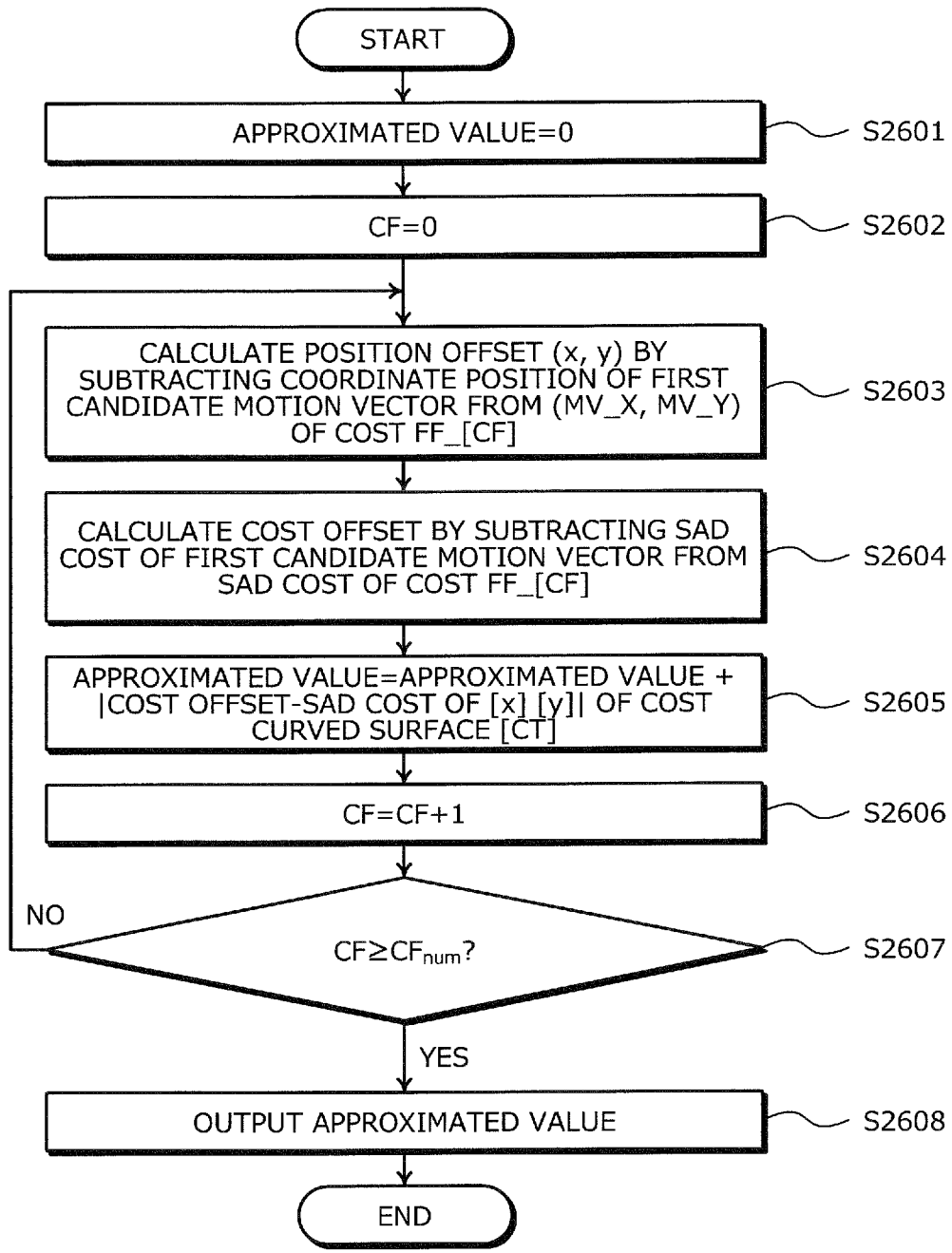
FIG. 26 is a flowchart of an example of a procedure of a approximated value calculation process for the cost curved surface.

FIG. 26 is a flowchart of an example of a procedure of the approximated value calculation process for the cost curved surface. The approximated value calculation process for the cost curved surface is a process of calculating the approximated value that represents the closeness of the cost curved surface to be processed to the SAD cost stored in the cost FF 612.

The encoding apparatus 100 sets the approximated value to be zero (step S2601), sets the variable CF used as the index of the cost FF 612 to be zero (step S2602), calculates the position offset (x, y) by subtracting the coordinate position of the first candidate motion vector from (MV_X, MV_Y) of the cost FF FF_[CF] (step S2603), and calculates the cost offset by subtracting the SAD cost of the first candidate motion vector from the SAD cost of the cost FF FF_[CF] (step S2604).

The encoding apparatus 100 calculates the approximated value according to "the approximated value=the approximated value+|the cost offset−the SAD cost of [x] [y]| of the cost curved surface [CT]" (step S2605). |x| is the absolute value of x. The encoding apparatus 100 increments the variable CF (step S2606) and determines if the variable CF is greater than or equal to $CF_{num}$ (step S2607). If the encoding apparatus 100 determines that the variable CF is less than $CF_{num}$ (step S2607: NO), the encoding apparatus 100 progresses to the operation at step S2603.

If the encoding apparatus 100 determines that the variable CF is greater than or equal to $CF_{num}$ (step S2607: YES), the encoding apparatus 100 outputs the approximated value (step S2608). After the operation at step S2608 comes to an end, the encoding apparatus 100 causes the approximated value calculation process for the cost curved surface to come to an end. The execution of the approximated value calculation process for the cost curved surface enables the encoding apparatus 100 to acquire the approximated valve to be used to select the optimal cost surface.

FIG. 27 is a flowchart of an example of a procedure of the pseudo merge cost calculation process. The pseudo merge cost calculation process is a process of calculating the cost of the merge vector to be processed. The encoding apparatus 100 sets the X offset to be "the X-coordinate of the merge vector [MM] to be the second candidate motion vector—the X-coordinate of the first candidate motion vector" (step S2701) and sets the Y offset to be "the Y-coordinate of the merge vector [MM]—the Y-coordinate of the first candidate motion vector" (step S2702).

The encoding apparatus 100 determines whether the merge vector [MM] is present within the range of the selected cost curved surface [CT] (step S2703). If the encoding apparatus 100 determines that the merge vector [MM] is present within the range of the selected cost curved surface [CT] (step S2703: YES), the encoding apparatus 100 calculates the pseudo SAD cost according to "the pseudo SAD cost=the cost curved surface [CT] table [X-offset] [Y-offset]" (step S2704) and also calculates the pseudo merge cost according to "the pseudo merge cost=the pseudo SAD cost+the vector cost" (step S2705).

If the encoding apparatus 100 determines that the merge vector [MM] is not present within the range of the selected cost curved surface [CT] (step S2703: NO), the encoding apparatus 100 sets the pseudo merge cost to be "Max cost" (step S2706). After the operation at step S2705 or S2706 comes to an end, the encoding apparatus 100 causes the pseudo merge cost calculation process to come to an end. The execution of the pseudo merge cost calculation process enables the encoding apparatus 100 to calculate the cost of the merge mode without using the reference image memory and the SAD calculation circuit.

FIG. 28 is an explanatory diagram of an example of a circuit that calculates the pseudo SAD cost. A case will be described with reference to FIG. 28 where the number $CT_{num}$ of cost curved surfaces is eight. A subtracter 2801 outputs a value obtained by subtracting the SAD cost of the first candidate motion vector from the SAD cost of a search point surrounding the first candidate motion vector, and a subtracter 2802 outputs a value obtained by subtracting the coordinate position of the first candidate motion vector from the coordinate position of a search point surrounding the first candidate motion vector.

An X-axis offset calculator 2803 and a Y-axis offset calculator 2804 respectively output an X-axis direction offset and a Y-axis direction offset from the output result of the subtracter 2802.

Subtracters 2811_0 to 2811_7 each output an absolute value of the difference of the process result of the subtracter 2801 and the cost identified using the X-axis direction offset and the Y-axis direction offset from each of the cost curved surface tables 613. For example, the subtracter 2811_0 outputs the absolute value of the difference of the process result of the subtracter 2801 and the cost identified using the X-axis direction offset and the Y-axis direction offset from the cost curved surface [0] table 801_0.

Adders 2812_0 to 2812_7 add the process results of the subtracters 2811_0 to 2811_7 and the values of FFs 2813_0 to 2813_7, respectively, and store the addition results into the FF 2813_0 to 2813_7. For example, the adder 2812_0 adds the process result of the subtracter 2811_0 and the value of the FF 2813_0 and stores the addition result into the FF 2813_0.

A comparator 2814 compares the values of the FF 2813_0 to 2813_7 with each other and outputs the identification number of the cost curved surface having the lowest value stored therein. The comparator 2814 causes the encoding apparatus 100 to select the optimal cost curved surface among the cost curved surfaces [0] to [7].

A subtracter 2821 outputs a value obtained by subtracting the coordinate position of the first candidate motion vector from the coordinate position of the second candidate motion vector selected from the plural merge vectors. An X-axis offset calculator 2822 and a Y-axis offset calculator 2823 respectively output the X-axis direction offset and the Y-axis direction offset obtained from the result output by the subtracter 2821.

A selector 2824 selects from among the SAD costs identified from the cost curved surface [0] table 801_0 to the cost curved surface [7] table 801_7 using the X-axis direction offset and the Y-axis direction offset, the SAD cost of the cost curved surface that is the output result of the comparator 2814.

An adder 2825 outputs a value obtained by adding the output result of the selector 2824 and the SAD cost of the first candidate motion vector. The output value is the pseudo SAD cost.

As described, according to the encoding apparatus 100, a pseudo SAD cost that is a predicted SAD cost of the merge mode is calculated using the result of the SAD cost of the non-merge mode to be the motion search. Thereby, the encoding apparatus 100 does not need to use the SAD calculation circuit and the reference image memory to execute the merge mode. Consequently, increases in the scale of the circuit can be suppressed and an increase in the speed of the encoding process can be facilitated. The pseudo SAD cost is a value predicted from the contents of the cost FF 612 that stores the result of the SAD cost during the motion search. The cost FF 612 includes the search point whose SAD cost is the lowest and the brightness slope around the search point whose SAD cost is the lowest, and edge information; and precision that is substantially equal to that of the SAD cost of the merge mode can be maintained.

According to the encoding apparatus 100, the pseudo SAD cost may be calculated from the optimal cost curved surface selected from the cost curved surface table 613, based on each of the plural cost curved surfaces stored in the cost curved surface table 613 and the contents of the cost FF 612. Thereby, the encoding apparatus 100 can suppress any drops in the accuracy of the pseudo SAD cost by selecting the optimal cost curved surface. The pseudo SAD cost can be calculated by referring merely one to the cost curved surface table 613 and therefore, the processing cycle can be reduced compared to that of the calculation of the SAD cost.

According to the encoding apparatus 100, the values of the parameters are determined by using the coordinate position of the vector and the parameter and substituting the contents of the cost FF 612 into the function model that expresses the evaluation value, of a vector that is the candidate motion vectors. The encoding apparatus 100 may calculate the pseudo SAD cost by substituting the coordinate position of the second candidate motion vector into the function model that uses the values of the parameters. Thereby, the encoding apparatus 100 can suppress any drops in the accuracy of the pseudo SAD cost by the function model without preparing the cost curved surface table 613.

According to the encoding apparatus 100, the contents of the cost FF 612 may be overwritten by calculating the SAD cost for each of the candidate vectors present within the predetermined distance from the candidate vector whose SAD cost is the lowest among the candidate vectors. Thereby, the encoding apparatus 100 can reduce the circuits of the cost FF.

The encoding method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

The encoding apparatus 100 described in the present embodiment can be realized by an application specific integrated circuit (ASIC) such as a standard cell or a structured ASIC or a programmable logic device (PLD) such as a field-programmable gate array (FPGA). Specifically, for example, functional units, the first calculating unit 601 to the motion vector determining and 606, of the encoding apparatus 100 are defined in hardware description language (HDL), which is logically synthesized and applied to the ASIC, the PLD, etc., thereby enabling manufacture of the encoding apparatus.

According to an aspect of an embodiment, increases in circuit scale are suppressed and the speed of the process related to encoding is increased.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have, been described in detail, it should be understood that the various changes, substitutions, and alterations could be made hereto without departing from the spirit and scope of the invention.

What is claimed is:

1. An encoding apparatus comprising
a processor that is configured to:
   calculate and store to a storage unit, an evaluation value for each candidate vector, each evaluation value being calculated based on a given block that is to be encoded among a plurality of blocks formed by dividing an original image, and a reference block on a reference image represented by each candidate vector that is a candidate motion vector of the given block;
   identify an evaluation value of a first candidate motion vector of the given block, based on the calculated evaluation values stored in the storage unit;
   calculate an evaluation value of a second candidate motion vector, based on the evaluation value of each candidate vector and the second candidate motion vector that is for the given block and selected from among motion vectors of adjacent blocks that are adjacent to the given block and among the blocks; and
   determine any one among the first candidate motion vector and the second candidate motion vector to be the motion vector of the given block, based on the identified evaluation value of the first candidate motion vector and the calculated evaluation value of the second candidate motion vector, wherein
the storage unit stores a plurality of surface data that each represent a surface formed when the evaluation value for the vector that is to be the candidate motion vector of the given block is arranged in a spatial coordinate system having a first axis and a second axis representing a coordinate position on the reference image indicated by the vector that is to be the candidate motion vector of the given block and a third axis representing the evaluation value of the vector,
the processor is further configured to select any among the surface data, based on the surface data stored in the storage unit and the evaluation value of each candidate vector, and
the processor calculates the evaluation value of the second candidate motion vector, based on the second candidate motion vector and the selected surface data.

2. The encoding apparatus according to claim 1, wherein
the processor is further configured to determine a value of a parameter by using a parameter and a coordinate position on the reference image represented by the vector and substituting a coordinate position of each candidate vector and the evaluation value of each candidate vector into a function model expressing the evaluation value of the vector that is to be the candidate motion vector of the given block, and
the processor calculates the evaluation value of the second candidate motion vector by using the determined value of the parameter and substituting a coordinate position of the second candidate motion vector into the function model.

3. The encoding apparatus according to claim 1, wherein
the processor calculates the evaluation value of each candidate vector present within a predetermined distance from the candidate vector whose evaluation value is lowest among the evaluation values calculated for each candidate vector and overwrites content in the storage unit with the calculated evaluation value.

4. A computer system comprising
a computer that is configured to:
   calculate and store to a storage unit, an evaluation value for each candidate vector, each evaluation value being calculated based on a given block that is to be encoded among a plurality of blocks formed by dividing an original image, and a reference block on a reference image represented by each candidate vector that is a candidate motion vector of the given block;
   identify an evaluation value of a first candidate motion vector of the given block, based on the calculated evaluation values stored in the storage unit;
   calculate an evaluation value of a second candidate motion vector, based on the evaluation value of each candidate vector and the second candidate motion vector that is for the given block and selected from among motion vectors of adjacent blocks that are adjacent to the given block and among the blocks; and
   determine any one among the first candidate motion vector and the second candidate motion vector to be the motion vector of the given block, based on the identified evaluation value of the first candidate motion vector and the calculated evaluation value of the second candidate motion vector, wherein
the storage unit stores a plurality of surface data that each represent a surface formed when the evaluation value for the vector that is to be the candidate motion vector of the given block is arranged in a spatial coordinate system having a first axis and a second axis representing a coordinate position on the reference image indicated by the vector that is to be the candidate motion vector of the given block and a third axis representing the evaluation value of the vector,
the computer is further configured to select any among the surface data, based on the surface data stored in the storage unit and the evaluation value of each candidate vector, and
the computer calculates the evaluation value of the second candidate motion vector, based on the second candidate motion vector and the selected surface data.

5. An encoding apparatus method that is executed by a computer, the encoding method comprising:

calculating and storing to a storage unit, an evaluation value for each candidate vector, each evaluation value being calculated based on a given block that is to be encoded among a plurality of blocks formed by dividing an original image, and a reference block on a reference image represented by each candidate vector that is a candidate motion vector of the given block;

identifying an evaluation value of a first candidate motion vector of the given block, based on the calculated evaluation values stored in the storage unit;

calculating an evaluation value of a second candidate motion vector, based on the evaluation value of each candidate vector and the second candidate motion vector that is for the given block and selected from among motion vectors of adjacent blocks that are adjacent to the given block and among the blocks; and determining any one among the first candidate motion vector and the second candidate motion vector to be the motion vector of the given block, based on the identified evaluation value of the first candidate motion vector and the calculated evaluation value of the second candidate motion vector, wherein the storage unit stores a plurality of surface data that each represent a surface formed when the evaluation value for the vector that is to be the candidate motion vector of the given block is arranged in a spatial coordinate system having a first axis and a second axis representing a coordinate position on the reference image indicated by the vector that is to be the candidate motion vector of the given block and a third axis representing the evaluation value of the vector, the encoding method further includes selecting any among the surface data, based on the surface data stored in the storage unit and the evaluation value of each candidate vector, and the calculating includes calculating the evaluation value of the second candidate motion vector, based on the second candidate motion vector and the selected surface data.

6. A non-transitory, computer-readable recording medium storing an encoding program that causes a computer to execute a process comprising:

calculating and storing to a storage unit, an evaluation value for each candidate vector, each evaluation value being calculated based on a given block that is to be encoded among a plurality of blocks formed by dividing an original image, and a reference block on a reference image represented by each candidate vector that is a candidate motion vector of the given block;

identifying an evaluation value of a first candidate motion vector of the given block, based on the calculated evaluation values stored in the storage unit;

calculating an evaluation value of a second candidate motion vector, based on the evaluation value of each candidate vector and the second candidate motion vector that is for the given block and selected from among motion vectors of adjacent blocks that are adjacent to the given block and among the blocks; and determining any one among the first candidate motion vector and the second candidate motion vector to be the motion vector of the given block, based on the identified evaluation value of the first candidate motion vector and the calculated evaluation value of the second candidate motion vector, wherein the storage unit stores a plurality of surface data that each represent a surface formed when the evaluation value for the vector that is to be the candidate motion vector of the given block is arranged in a spatial coordinate system having a first axis and a second axis representing a coordinate position on the reference image indicated by the vector that is to be the candidate motion vector of the given block and a third axis representing the evaluation value of the vector, the process further includes selecting any among the surface data, based on the surface data stored in the storage unit and the evaluation value of each candidate vector, and the calculating includes calculating the evaluation value of the second candidate motion vector, based on the second candidate motion vector and the selected surface data.

\* \* \* \* \*